(12) United States Patent
Tenmyo

(10) Patent No.: US 7,726,889 B2
(45) Date of Patent: Jun. 1, 2010

(54) OPTICAL DEVICE AND METHOD FOR REMOVING FOREIGN SUBSTANCES FROM THE OPTICAL DEVICE

(75) Inventor: Yoshiharu Tenmyo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 11/736,345

(22) Filed: Apr. 17, 2007

(65) Prior Publication Data

US 2007/0242950 A1    Oct. 18, 2007

(30) Foreign Application Priority Data

Apr. 18, 2006    (JP)    ............................... 2006-115010

(51) Int. Cl.
  *G03B 9/08*    (2006.01)
(52) U.S. Cl. ...................... 396/456; 348/367
(58) Field of Classification Search ................ 396/452, 396/456, 463, 489; 348/207.99, 231.99, 348/335, 367
  See application file for complete search history.

(56) References Cited

U.S. PATENT DOCUMENTS

| 5,818,524 | A | * | 10/1998 | Juen | ....................... 348/231.99 |
| 6,071,019 | A |   | 6/2000 | Shimada | |
| 2004/0047625 | A1 |   | 3/2004 | Ito et al. | |
| 2004/0218738 | A1 | * | 11/2004 | Arai et al. | ................. 379/93.17 |
| 2005/0088563 | A1 | * | 4/2005 | Ito et al. | ...................... 348/335 |
| 2005/0237421 | A1 |   | 10/2005 | Kosugiyama | |
| 2005/0280712 | A1 | * | 12/2005 | Kawai | .................... 348/207.99 |

FOREIGN PATENT DOCUMENTS

| EP | 1482344 A | 12/2004 |
| JP | 10-020364 | 1/1998 |
| JP | 10-052697 | 2/1998 |
| JP | 08-211445 | 8/1998 |
| JP | 3576703 | 10/2004 |

OTHER PUBLICATIONS

All of the above references were cited in a Dec. 4, 2009 European Search Report of the counterpart European Patent Application No. 07106402.6.

* cited by examiner

*Primary Examiner*—Melissa J Koval
*Assistant Examiner*—Autumn Parker
(74) *Attorney, Agent, or Firm*—Cowan, Liebowitz & Latman, P.C.

(57) ABSTRACT

Foreign substances adhered to a focal plane shutter are shaken off by vibrationally driving the shutter a plurality of times in succession while the focal plane shutter, which controls the incidence of light on a photoelectric transducer converting an optical image of a photographic object into an electrical signal, shields the photoelectric transducer from light incident thereon. In other words, implementing vibrational removal of adhered foreign substances by means of overloading the focal plane shutter.

10 Claims, 15 Drawing Sheets

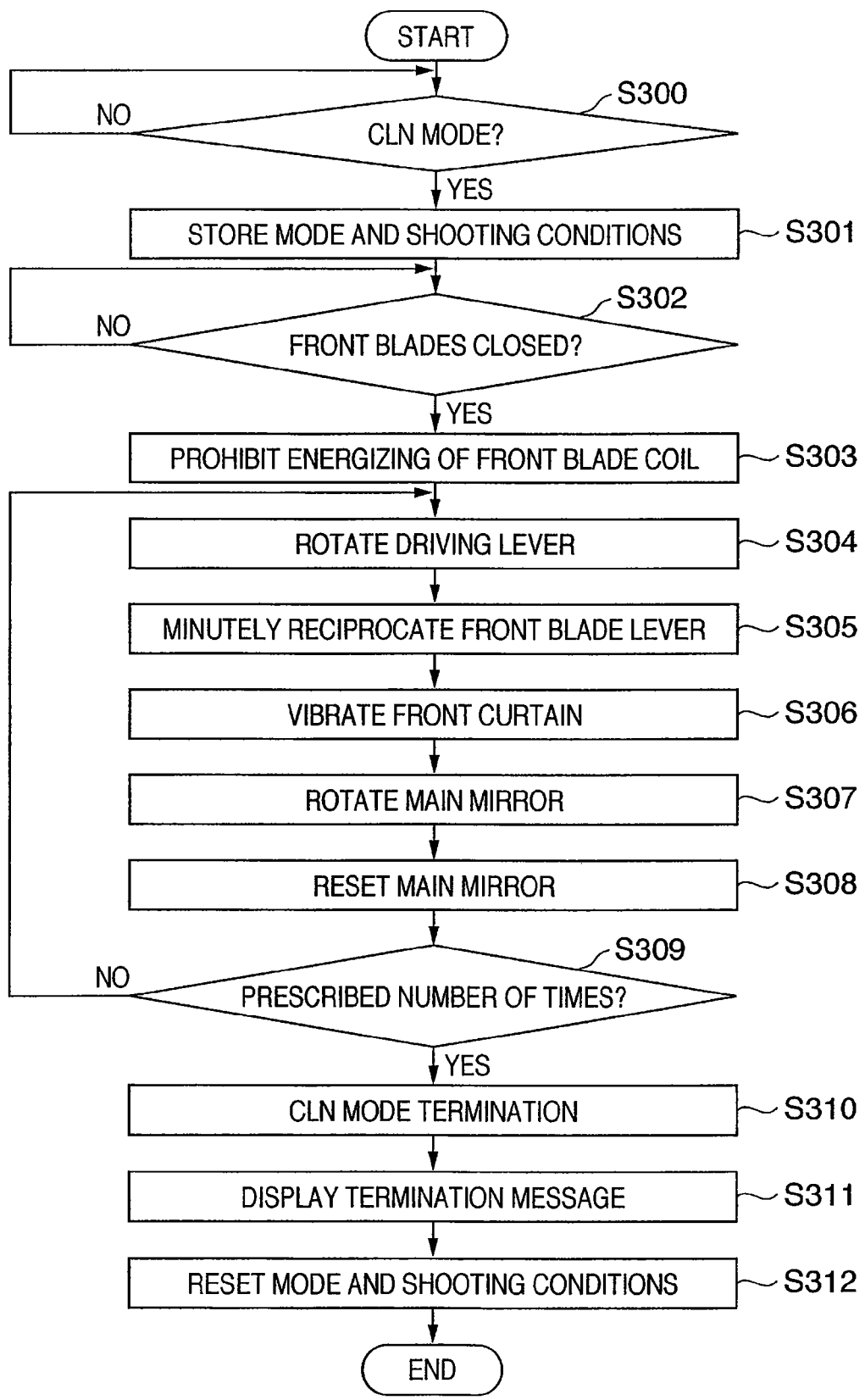

OPTICAL DEVICE AND METHOD FOR REMOVING FOREIGN SUBSTANCES FROM THE OPTICAL DEVICE

BACKGROUND OF THE INVENTION

1. Field of the Invention

The present invention relates to a technology for removing dust and other foreign substances adhered to a focal plane shutter in an optical device such as a digital camera.

2. Description of the Related Art

In the past, the presence of dust in the vicinity of the focal plane of a shooting lens used in a lens-exchangeable type of digital single-lens reflex camera created a problem because the dust projected its shadow onto a solid-state image sensing device. Such dust is believed to find its way from the outside when lenses are exchanged, or to be produced as fine abrasive dust consisting of resin and other structural member materials as a result of movement of the shutter and mirrors in the camera. If such dust entered the space between the cover glass used for the protection of the solid-state image sensing device and the optical filters, such as an infrared cutoff filter or a low-pass optical filter, etc., which were arranged in front of the cover glass, the camera had to be taken apart in order to remove the dust. Accordingly, methods used to address the problem consisted in creating a sealed structure adapted to prevent dust from entering the space between the optical filters and the cover glass of the solid-state image sensing device.

However, the problem was that the dust adhered to the surface of the side of the optical filter opposite the solid-state image sensing device and, when it was in the vicinity of the focal plane, the dust created a shadow that still ended up being projected onto the solid-state image sensing device. The mechanism, whereby dust adheres to the surface of the side (lens unit side) of the optical filter opposite the solid-state image sensing device is believed to be as follows.

A focal plane shutter is usually arranged in extended condition (in which the shutter is closed) in front of the optical filter. Therefore, a structure is created, in which dust generated for the above-described reasons does not directly adhere to the optical filter. Namely, it is believed that, after adhering to the extended shutter blades, the dust generated for the above-mentioned reasons is scattered by the opening/closing operation of the shutter and adheres to the optical filter by passing through the shutter when it is opened.

In view of this problem, a double light-shielding system shutter, which is constructed with a view to impede the adhesion of dust to the optical filter, was proposed in Japanese Patent Application No. 08-211445. It has shutter blades reduced in weight in order to raise the travel speed of the shutter blades and is adapted to increase shielding with the help of two groups of blades maintained in extended condition while in the shooting-ready state in order to avoid shielding-related problems caused by the thinning of the shutter blades. In accordance with this construction, even if the dust is scattered as a result of a shutter release operation first actuating the shutter blade group that has dust adhered thereto, another shutter blade group on the optical filter side is in an extended condition. Therefore, even if the scattered dust moves towards the optical filter, the latter is shielded by the shutter blade group maintained in the extended condition and the dust cannot reach the optical filter, which prevents the dust from adhering to the optical filter. Moreover, since the shutter blade group on the optical filter side, which had little dust adhesion, is actuated after actuating the first shutter blade group, the construction makes it possible to greatly reduce the amount of dust adhered to the optical filter in comparison with the focal plane shutter of the above-mentioned conventional construction.

In addition, Japanese Patent No. 3576703 disclosed shutter overloading as an operation performed in an optical device in order to increase shutter speed.

In the double light-shielding system shutter described in Japanese Patent Application No. 08-211445, dust adhesion to the optical filter cannot be completely prevented if the operation of the other shutter blade group starts before dust scattered by the initially actuated shutter blade group completely settles. Moreover, the need for special operations to ensure that the two groups of blades are in extended condition for the purpose of shielding in the shooting-ready state has led to problems due to the increased time lag between pressing the release button and the start of shooting.

SUMMARY OF THE INVENTION

It is an object of the present invention to address the above-described problems of the conventional technology.

The feature of the present invention is capable of eliminating foreign substances adhered to the shutter without requiring a special power source.

According to a first aspect of the present invention, there is provided an optical device comprising:

a photoelectric transducer configured to convert an optical image of a photographic object into an electrical signal;

a focal plane shutter configured to control incidence of light on the photoelectric transducer;

a driving unit configured to drive the focal plane shutter; and a vibration control unit configured to vibrationally drive the focal plane shutter a plurality of times in succession using the driving unit while the focal plane shutter shields the photoelectric transducer from light incident thereon.

According to a second aspect of the present invention, there is provided a method for removing foreign substances from an optical device comprising a photoelectric transducer that converts an optical image of a photographic object into an electrical signal, a focal plane shutter that controls incidence of light on the photoelectric transducer, and a driving unit that drives the focal plane shutter, the method comprising:

a vibration step of vibrationally driving the focal plane shutter a plurality of times in succession while the focal plane shutter shields the photoelectric transducer from light incident thereon.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a flow chart explaining control processing performed by a camera system controller of a camera according to a third embodiment of the present invention.

DESCRIPTION OF THE EMBODIMENTS

The preferred embodiments of the present invention are explained in detail below by referring to the attached drawings. It should be noted that the embodiments below do not limit the present invention as defined in the claims and not all combinations of the features described in the present embodiment are necessarily essential as a means of solution in the present invention.

The camera explained in the present embodiment is a lens exchangeable type of digital single-lens reflex camera (hereinafter referred to as "camera" for short). It should be noted that the embodiments below are mere examples of means used to reduce the present invention to practice, which should be appropriately corrected or modified depending on the various conditions and constructions of the devices, to which the present invention is applied, with the present invention not being limited to the embodiments below.

Moreover, the present invention is achieved by supplying storage media (or recordable media) containing software program code implementing the functions of the devices described as embodiments below to a system or device and allowing the computer (CPU or MPU) of the system or device to read and execute the program code stored on the storage media.

Figure 1:
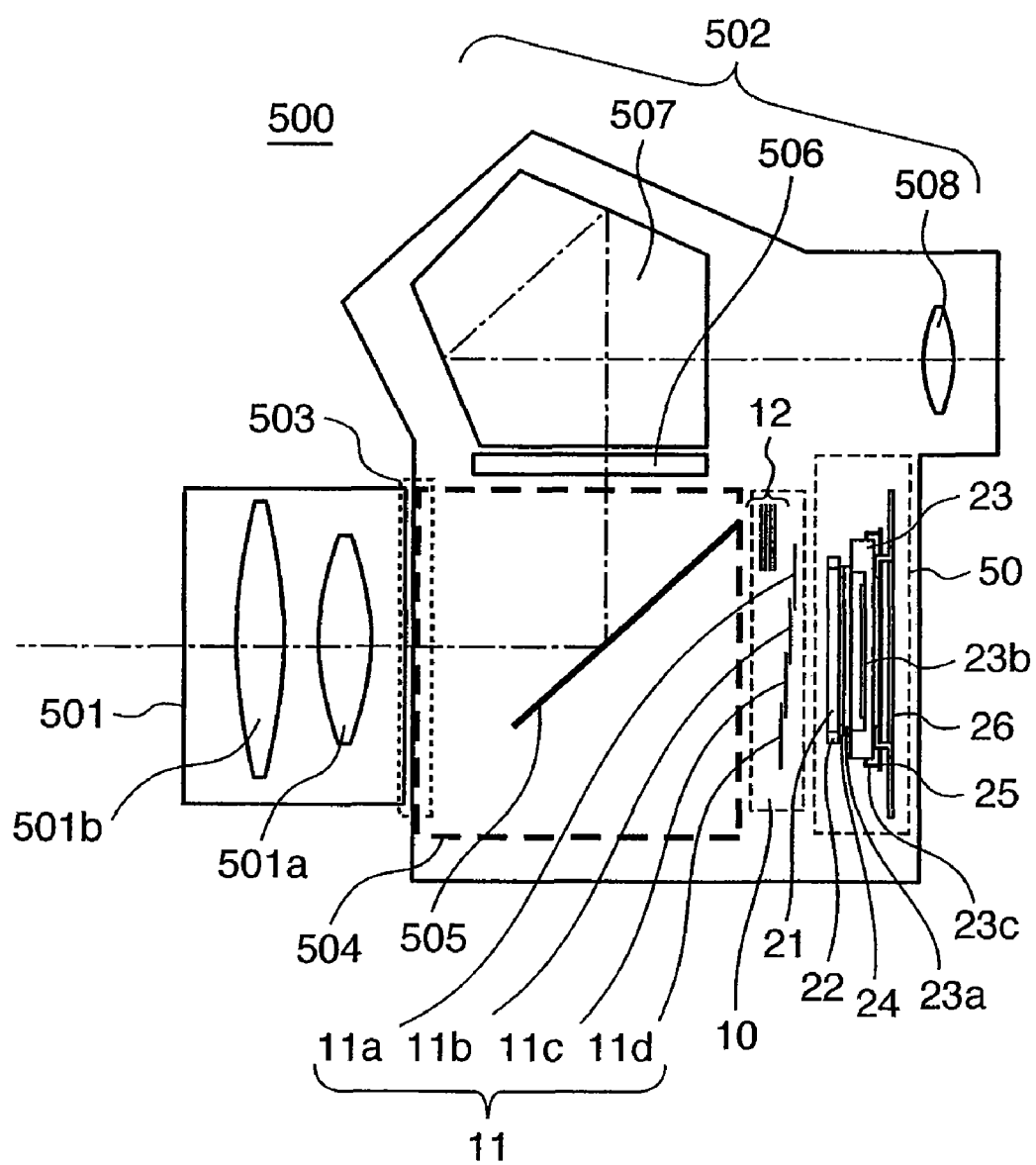
FIG. 1 depicts a schematic cross-sectional view explaining the arrangement of a camera in the shooting-ready state according to an embodiment of the present invention.

FIG. 1 depicts a schematic cross-sectional view, which explains the construction of a camera 500 according to the present embodiment, and illustrates an image sensing-ready state wherein a user views an object image projected from an exchangeable lens unit 501 for the purpose of ascertaining the composition etc. of a photographic object.

Figure 2:
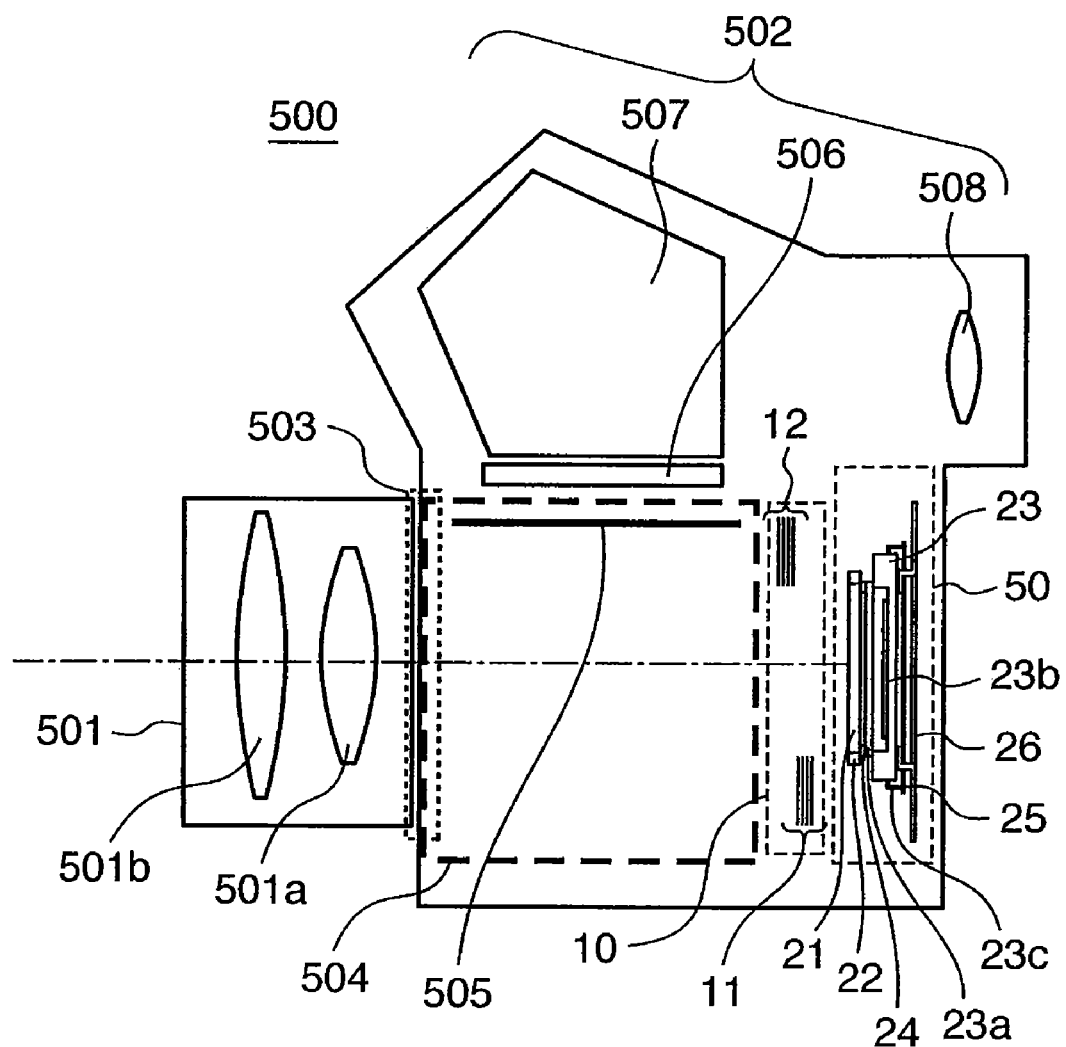
FIG. 2 depicts a schematic cross-sectional view explaining the arrangement of a camera during shooting according to the present embodiment.

FIG. 2 depicts a schematic cross-sectional view explaining the arrangement of a camera 500 during image sensing according to the present embodiment. It should be noted that common parts are designated by the same reference numerals in FIGS. 1 and 2.

The exchangeable lens unit 501 has a plurality of lenses (501a, 501b, etc.) for capturing light reflected from a photographic object and forming an image on a solid-state image sensing unit 23. A lens mount 503 is used to install the exchangeable lens unit 501 in the camera body. A main mirror (quick-return mirror) 505 is arranged along the optical axis of an image sensing unit 50 and the exchangeable lens unit 501 in a space referred to as a mirror box 504. In the shooting-ready state illustrated in FIG. 1, the mirror 505 reflects arriving luminous flux upwards in FIG. 1 in order to guide it into a viewfinder 502, thereby enabling the user to view the object image. A focal plane shutter 10 has a front curtain 11, which is composed of a group of shutter blades 11a to 11d that allow the luminous flux projected from the lens unit 501 to illuminate the image sensing unit 50 for any desired time, and a rear curtain 12, which is of the same construction. The viewfinder 502 has a focusing screen 506, a prism 507, and an eye-piece lens 508. The focusing screen 506 forms an image from the luminous flux reflected upward from the main mirror 505. The prism 507 internally reflects the image so as to turn the image formed on the focusing screen 506 into an erect real image. The eye piece lens 508 is adapted to enable the user to view the image emerging from the prism 507 at an appropriate magnification.

The construction of the image sensing unit 50 is explained next. An optical element 21 contains an infrared filter, a low-pass filter, etc. A retaining member 22 retains the optical element 21 in position relative to the solid-state image sensing unit 23. A cover member 23a is a cover used to protect the solid-state image sensing device 23b. A sealing member 24 seals the space between the optical element 21 and the cover member 23a of the solid-state image sensing unit 23. Connection terminals 23c are the electrical connection terminals of the solid-state image sensing unit 23, with the terminals 23c being connected to a substrate 25 having disposed thereon electrical elements forming a control circuit controlling the operation of the camera 500. Formed integrally with the solid-state image sensing unit 23, a retaining plate 26 secures the solid-state image sensing unit 23 to the chassis (not shown) of the camera 500 with machine screws (not shown).

As shown in FIG. 1, before image sensing, the luminous flux is reflected vertically upward from the main mirror 505 arranged along the optical axis and an object image is formed on the focusing screen 506. The object image is further turned into an erect real image by the prism 507. This way, the operator can verify the object image through the eye-piece lens 508.

On the other hand, during image sensing, as shown in FIG. 2, the main mirror 505 is raised so as to remove it from the optical axis in order to direct the luminous flux projected from the exchangeable lens unit 501 to the image sensing unit 50. As a result, the luminous flux projected from the exchangeable lens unit 501 passes through an aperture formed by the front curtain 11 and rear curtain 12 of the focal plane shutter 10 and is incident on the image sensing unit 50. It should be noted that, in FIG. 2, parts common with FIG. 1 are designated by the same reference numerals.

Figure 3:
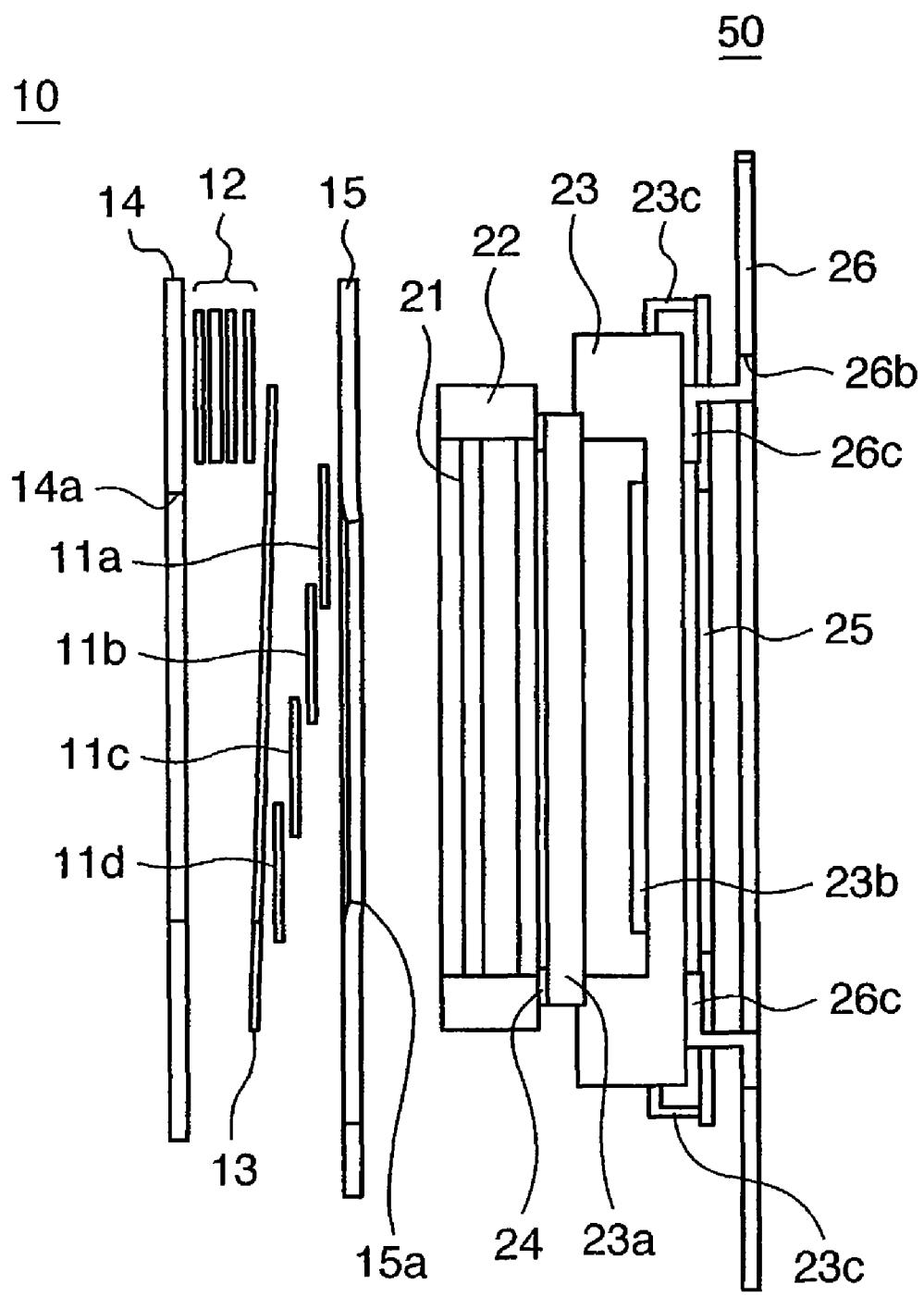
FIG. 3 depicts a schematic view of an image sensing unit and a focal plane shutter in a camera according to the present embodiment.

FIG. 3 depicts a schematic of the image sensing unit 50 and focal plane shutter 10 used in the camera 500 according to the present embodiment, wherein parts common with the previously described drawings are indicated by the same reference numerals and their explanation is omitted.

In FIG. 3, the focal plane shutter 10 has a front curtain 11, which is equipped with a shutter blade group 11a to 11d, a rear curtain 12, which is also equipped with a plurality of shutter blades, and an intermediate plate 13, which divides the driving space of the front curtain 11 and rear curtain 12. Furthermore, it has a backing plate 14, which serves as a backing plate for the rear curtain 12 and, at the same time, has an aperture 14a provided substantially in the central portion thereof for image sensing, and a cover plate 15, which serves as a backing plate for the front curtain 11 and, at the same time, has an aperture 15a provided substantially in the central portion thereof for image sensing. It should be noted that the shutter blades of the rear curtain 12 and the shutter blade group 11a to 11d, which constitutes the front curtain 11, are adapted to perform the opening/closing operation jointly with the help of a plurality of driving levers (not shown). Moreover, these shutter blades are composed of electrically conductive material in order to prevent the shutter blades from tribocharging and creating a frictional load during the opening/closing operation. In addition, they are surface treated to enhance the slidability of their surfaces and to prevent-charge build-up.

In the above-described construction, when the release button is pressed in the shooting-ready state depicted in FIG. 1, first of all, the blades of the first shutter blade group 11a to 11d are stacked, uncovering the shutter, and, upon elapse of a predetermined time period after the start of travel of the front curtain 11, the rear curtain 12, which is constituted by the second shutter blade group, is extended and the shutter is closed. As a result, the aperture 14a and aperture 15a are uncovered and an exposure operation is carried out for a predetermined period of time. Upon completion of shooting, a loading power source returns the front curtain 11 to an extended condition and the rear curtain 12 to a stacked condition in preparation for the next shooting.

Because the solid-state image sensing device 23b in the image sensing unit 50 has pixels arranged at limited intervals, light with a spatial frequency higher than these intervals can only go into a single pixel. This produces color moiré and false colors recognized as colors different from the original colors. Moreover, incident light reflected at the surface of the solid-state image sensing device 23b creates problems such as infrared "ghost images" and "fog". In order to prevent this from happening, the optical element 21, which is produced by superimposing a low-pass filter, an infrared cutoff filter, etc., is arranged in front of the solid-state image sensing unit 23. Moreover, the solid-state image sensing unit 23 and optical element 21 are sealed using the sealing member 24.

Incidentally, unlike a film camera, this digital camera 500 performs image sensing with the help of the image sensing unit 50. For this reason, when dust adheres to the optical element 21, which is on the outermost surface of the image sensing unit 50, light no longer reaches the solid-state image sensing device 23b and a shadow is transferred to the captured image in the location of the adhered dust.

The following factors are believed to be the reasons why the dust is generated.

1. In a camera with a focal plane shutter 10, such as the camera 500, coating is peeled off the shutter blades when the rear curtain 12 and front curtain 11 of the focal plane shutter 10 rub against each other during shutter operation. The thus peeled coating turns into dust and remains inside the camera.

2. In a lens-exchangeable type camera, such as the camera 500, when the exchangeable lens unit 501 is not installed, a mount cap (not shown) is installed to protect the lens mount 503 of the camera. The mount cap is scratched when the mount cap and the mount 503 rub against each other, with particles scraped off the mount cap turning into dust.

3. When the exchangeable lens unit 501 is exchanged, dust sometimes penetrates into the camera from the outside.

Figure 4:
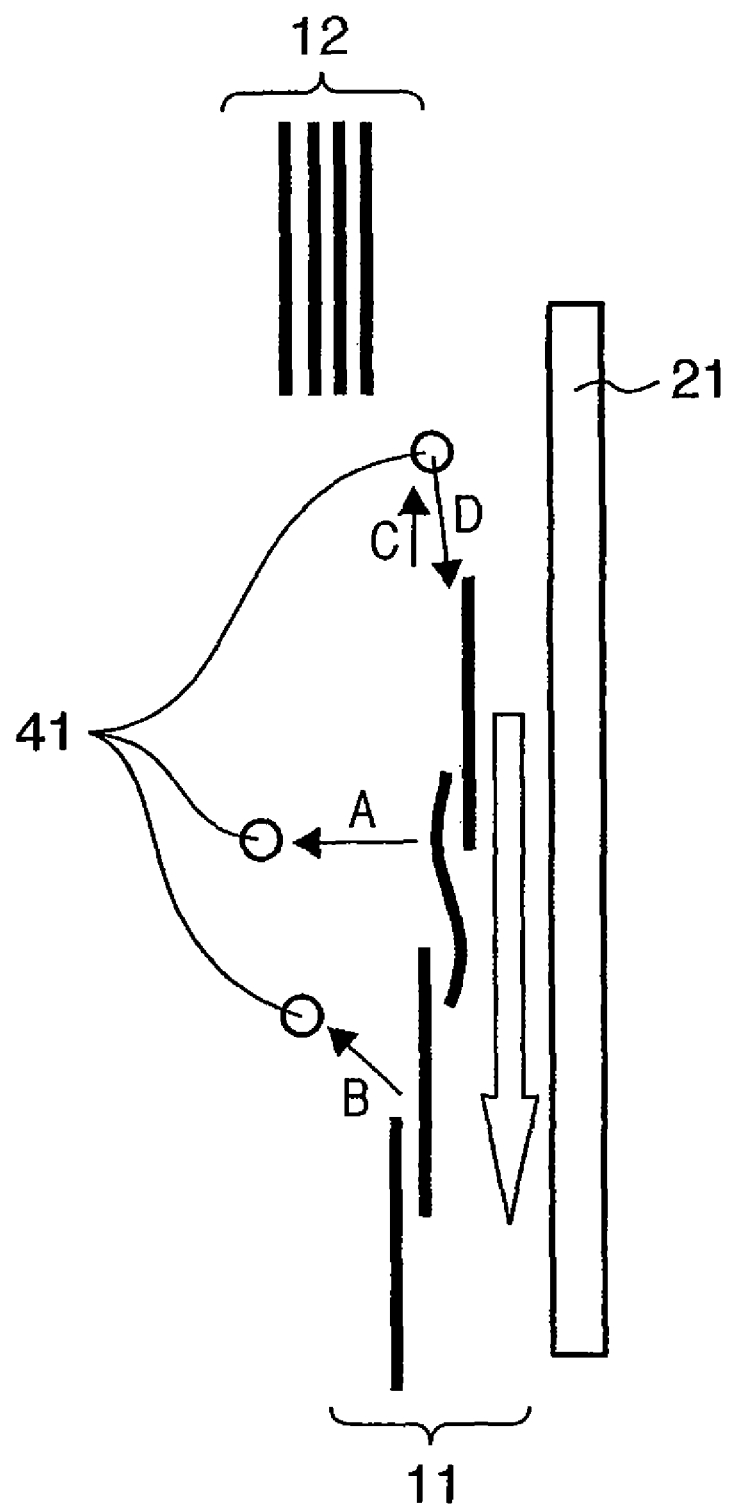
FIG. 4 is a diagram explaining the adhesion of generated dust to an optical element.

FIG. 4 is a diagram explaining how the thus generated dust adheres to the optical element 21.

The optical element 21 is shielded by the extended front curtain 11 at all times except for the moments when shooting is performed. Thus, dust generated for the above-mentioned reasons (2) or (3) (shown at 41 in FIG. 4) is present inside the mirror box 504, e.g. on the main mirror 505 and the extended front curtain 11. It is believed that dust 41 adhered to components other than the extended front curtain 11 and main mirror 505 is unlikely to adhere directly to the optical element 21 and most of the dust 41 adhering to the optical element 21 is believed to first adhere to the front curtain 11.

When a shooting operation is initiated by pressing the release button of the camera 500 in this state, the blades of the front curtain 11 are progressively stacked and the shutter is opened. On the other hand, the rear curtain 12, which is in stacked condition, progressively extends while forming a slit together with the front curtain 11 in a direction perpendicular to the optical axis so as to permit a fixed amount of light to go through and reach the image sensing unit 50. At such time, (C) remaining inertial forces, (B) driving forces due to the scraping resulting from the stacking of the shutter blade group 11a to 11d, and (A) driving forces caused by vibration generated by the deflection of the shutter blades act on the dust 41 adhered to the front curtain 11. As a result, most of the dust 41 separated from the front curtain 11 has an initial velocity toward the lens unit 501. On the other hand, some dust particles 41 floating in the air under the action of the inertial forces have an initial velocity toward the optical element 21 due to the negative pressure created by the absence of the front curtain 11. Among them, slower dust particles 41 having initial velocities in the direction of the lens unit 501, which constitute most of the dust 41 shaken off the front curtain 11, are intercepted in their movement in the direction of the lens unit 501 by the rear curtain 12 which travels so as to form a slit together with the front curtain 11. The dust is then flicked off towards the optical element 21 by the deflection of the rear curtain 12 and adheres to the optical element 21.

It is believed that dust 41 adheres to the optical element 21 as a result of the above-described process. Accordingly, it is evident that an important condition required to prevent dust 41 from adhering to the optical element 21 consists in preventing dust 41 from adhering to the extended front curtain 11 in the shooting-ready state.

In the present embodiment, which was designed with consideration of this problem, the adhesion of the dust 41 to the optical element 21 is prevented by forcibly dislodging the dust 41 adhered to the front curtain 11 from the front curtain 11 (shutter blades) prior to the start of a shooting operation. To implement such operation, the first embodiment employs an overloading-enabled shutter. Shutter overloading was originally intended to increase the curtain speed so as to raise stroboscope-timed speed and increase the maximum shutter speed and consisted in increasing the loading force of the driving spring driving the shutter blades. In this manner, such an overloading operation was intended to load the driving spring in excess of the normal amount of loading. Thus, the overloading operation provided loading in excess of normal loading, and during this operation, shutter blades were kept closed and did not directly affect exposure at the time of picture-taking. Thus, such an overloading operation can be carried out on an independent basis.

In view of the above-described problems, this embodiment is adapted to use the force of this overloading action as a drive source for shaking off dust 41 adhered to the front curtain 11 and causing the dust 41 adhered to the front curtain (shutter blades) to fall off by imparting vibration to the shutter blades by applying this motive force thereto in the form of an impact force.

The construction of the overloading-enabled shutter of the present embodiment is explained below by referring to FIG. 5 to FIG. 11.

Figure 5:
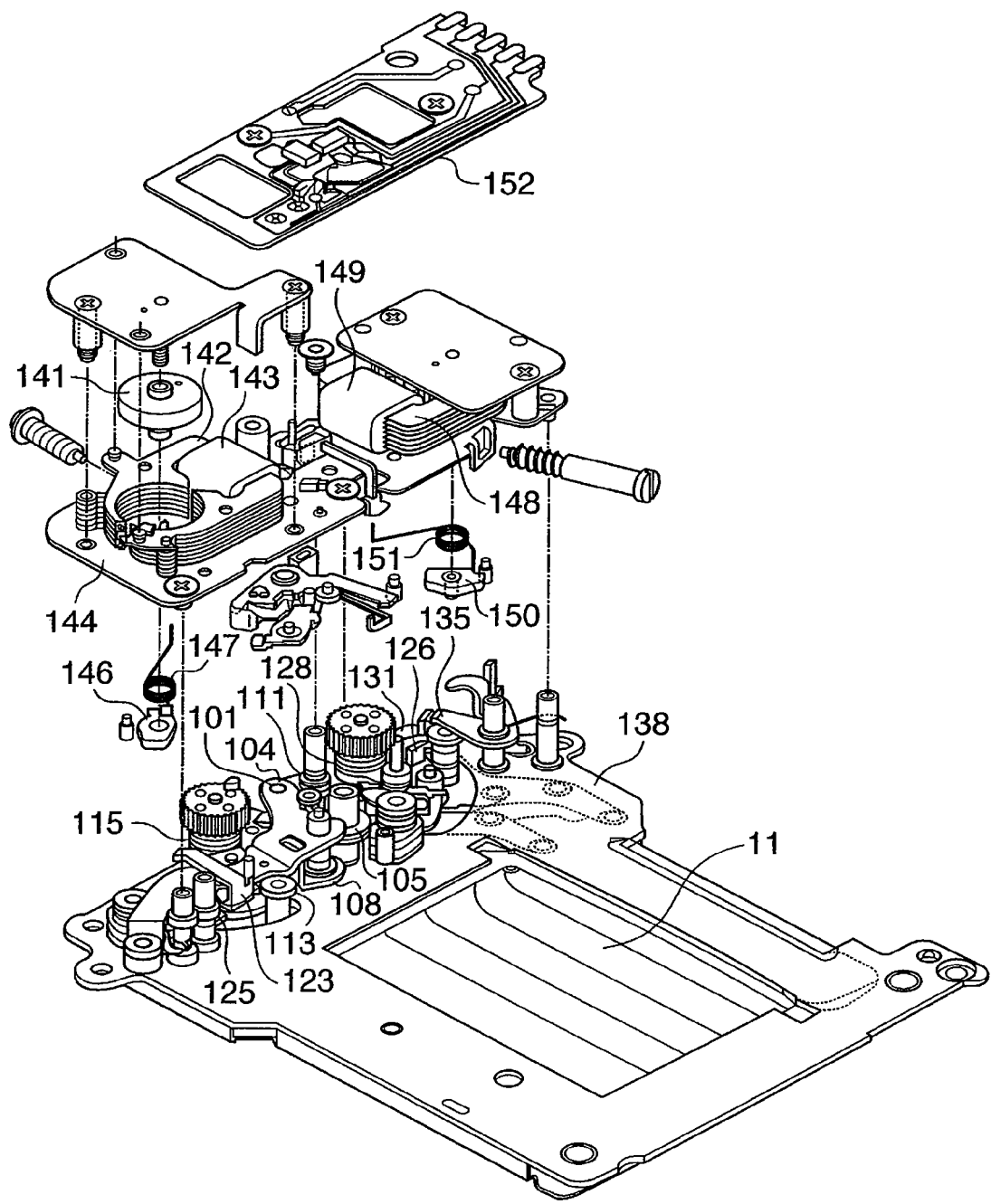
FIG. 5 depicts a perspective view illustrating the overall construction of the shutter unit according to the present embodiment.
Figure 6:
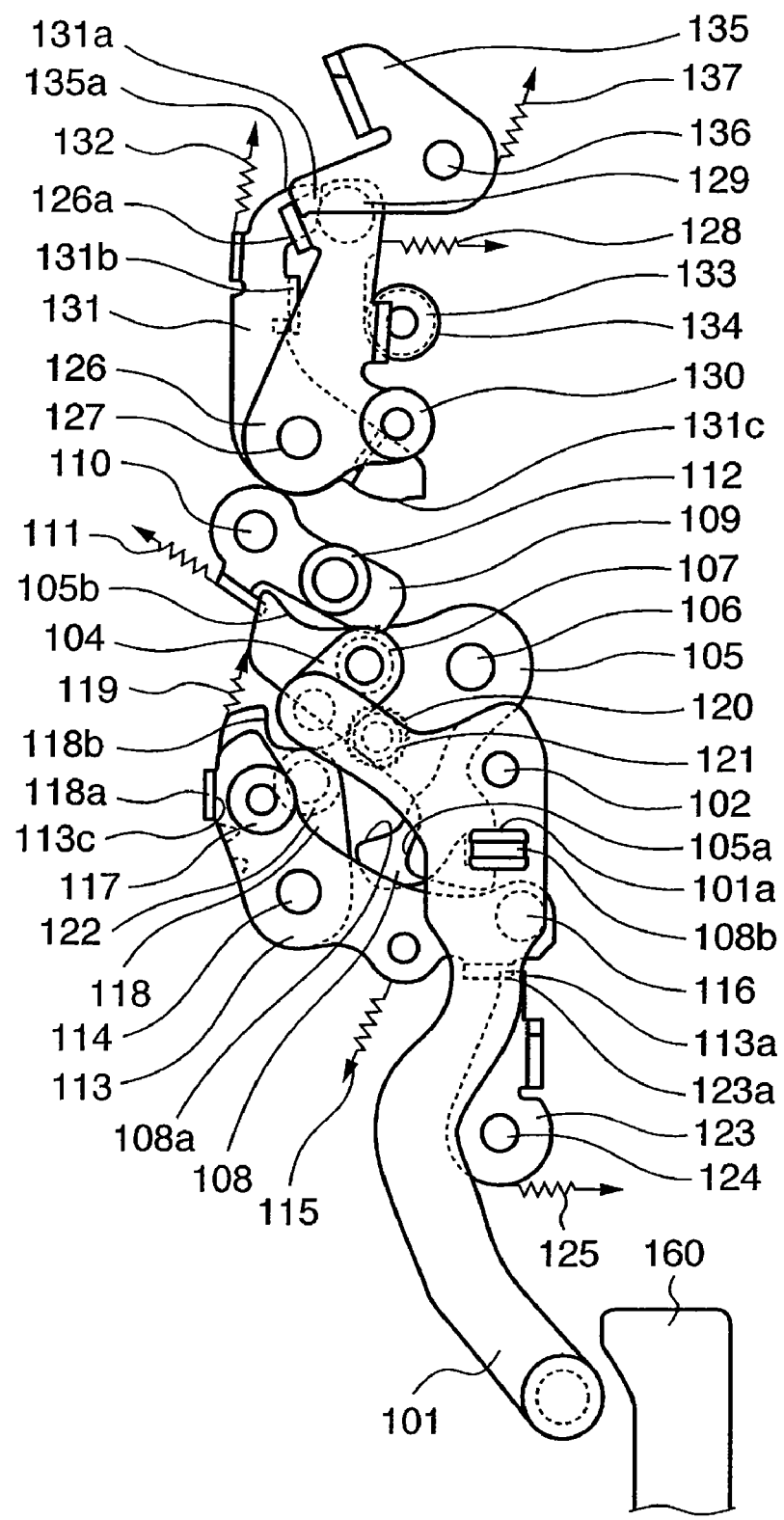
FIG. 6 depicts a plan view of the main portion of a mechanism illustrating a loaded state in a camera according to the present embodiment.
Figure 7:
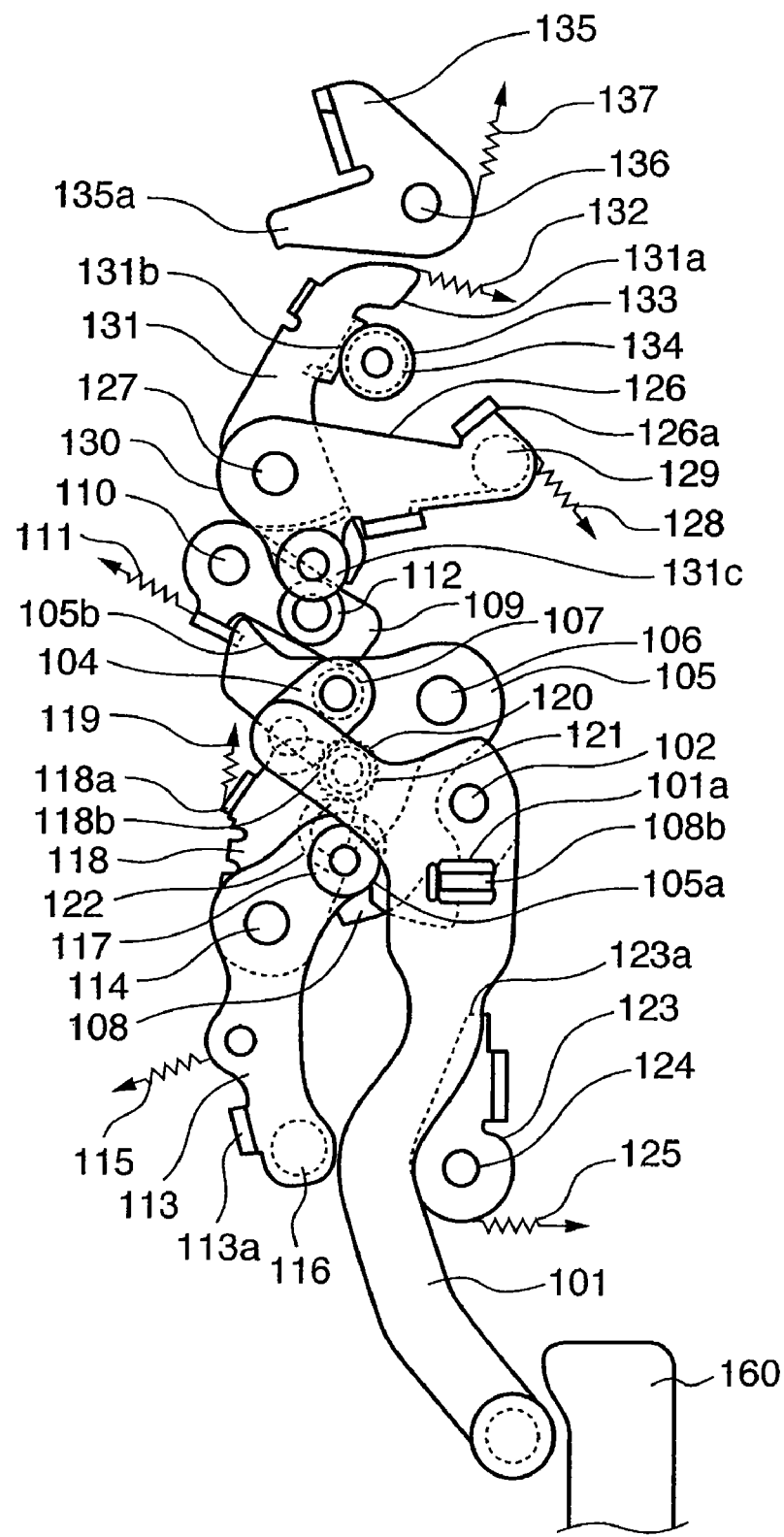
FIG. 7 depicts a plan view of the main portion of a mechanism depicting a state obtained upon completion of exposure by a front curtain and a rear curtain (state prior to the start of loading) in a camera according to the present embodiment.

FIG. 5 depicts a perspective view illustrating the overall construction of the shutter unit according to the present embodiment. FIG. 6 depicts a plan view of the main portion of a mechanism depicting a loaded state and FIG. 7 depicts a plan view of the main portion of a mechanism depicting a state obtained upon completion of exposure (prior to the start of loading) by the front curtain 11, which is constituted by a first group of shutter blades, and the rear curtain 12, which is constituted by a second group of shutter blades.

Figure 8:
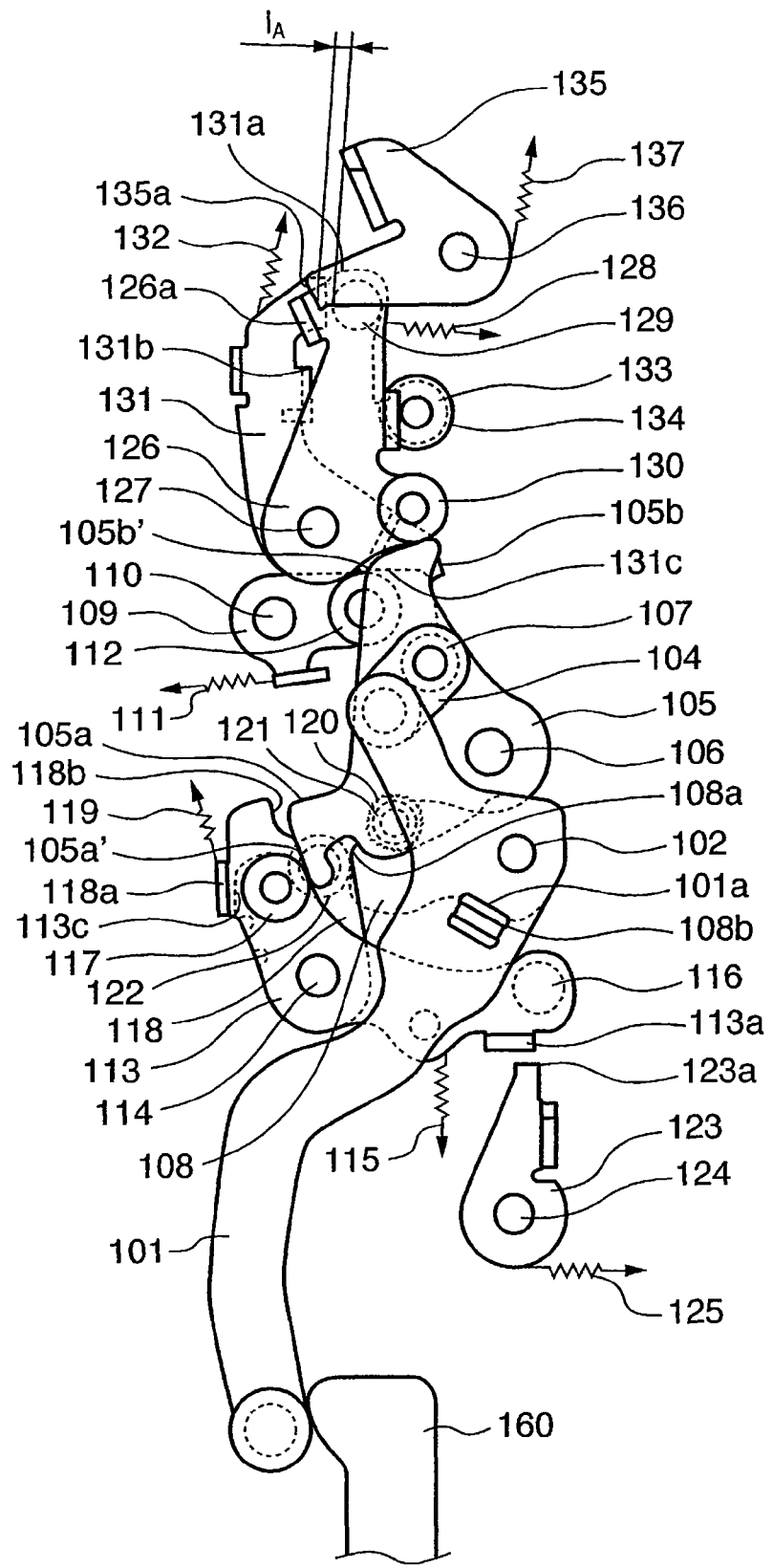
FIG. 8 depicts a plan view of the main portion of a mechanism illustrating an overloaded state obtained upon completion of loading in a camera according to the present embodiment.
Figure 9:
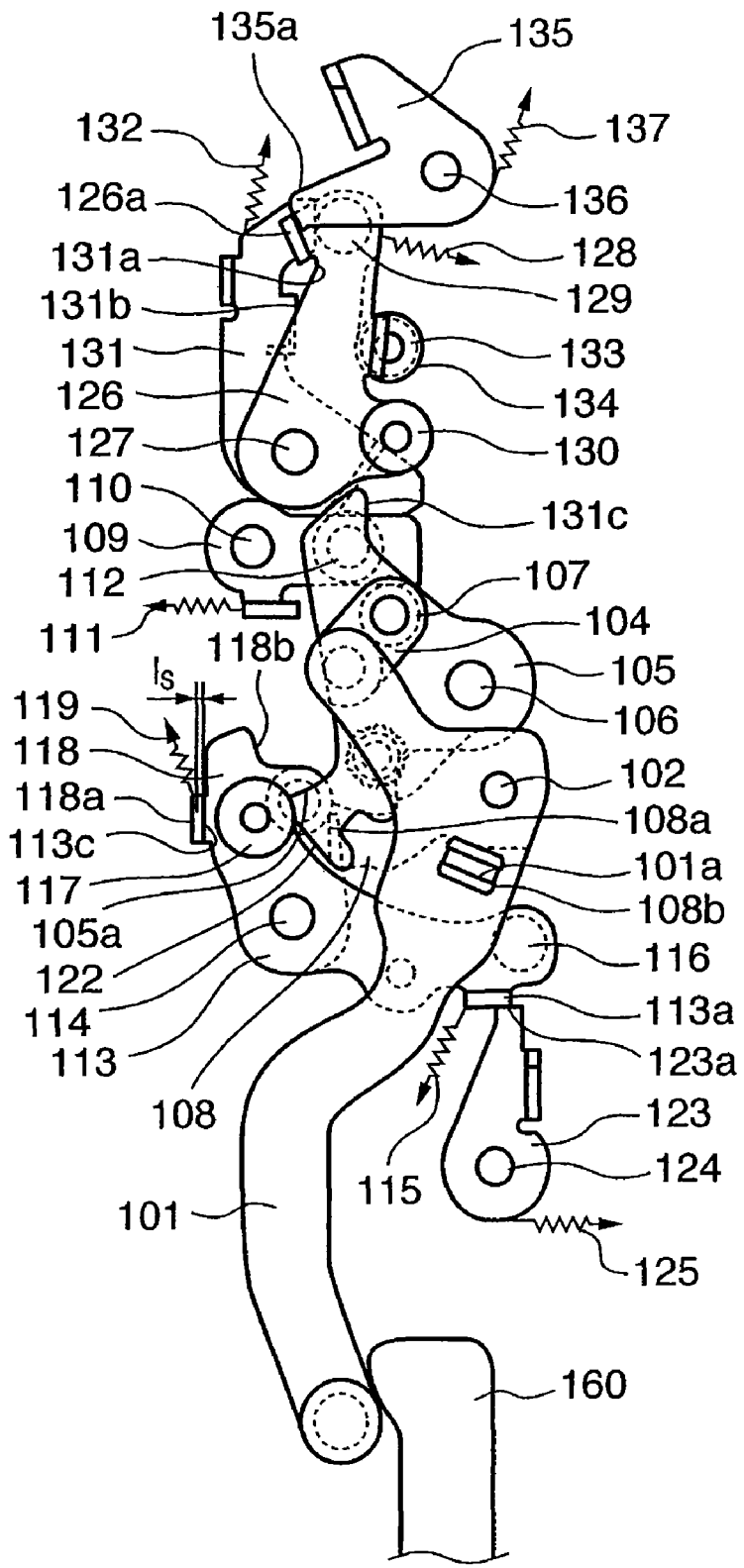
FIG. 9 depicts a plan view of the main portion of a mechanism depicting a state, in which a front driving lever moves from an overloaded position to a loaded position, and a front sublever is in the overloaded position in a camera according to the present embodiment.
Figure 10:
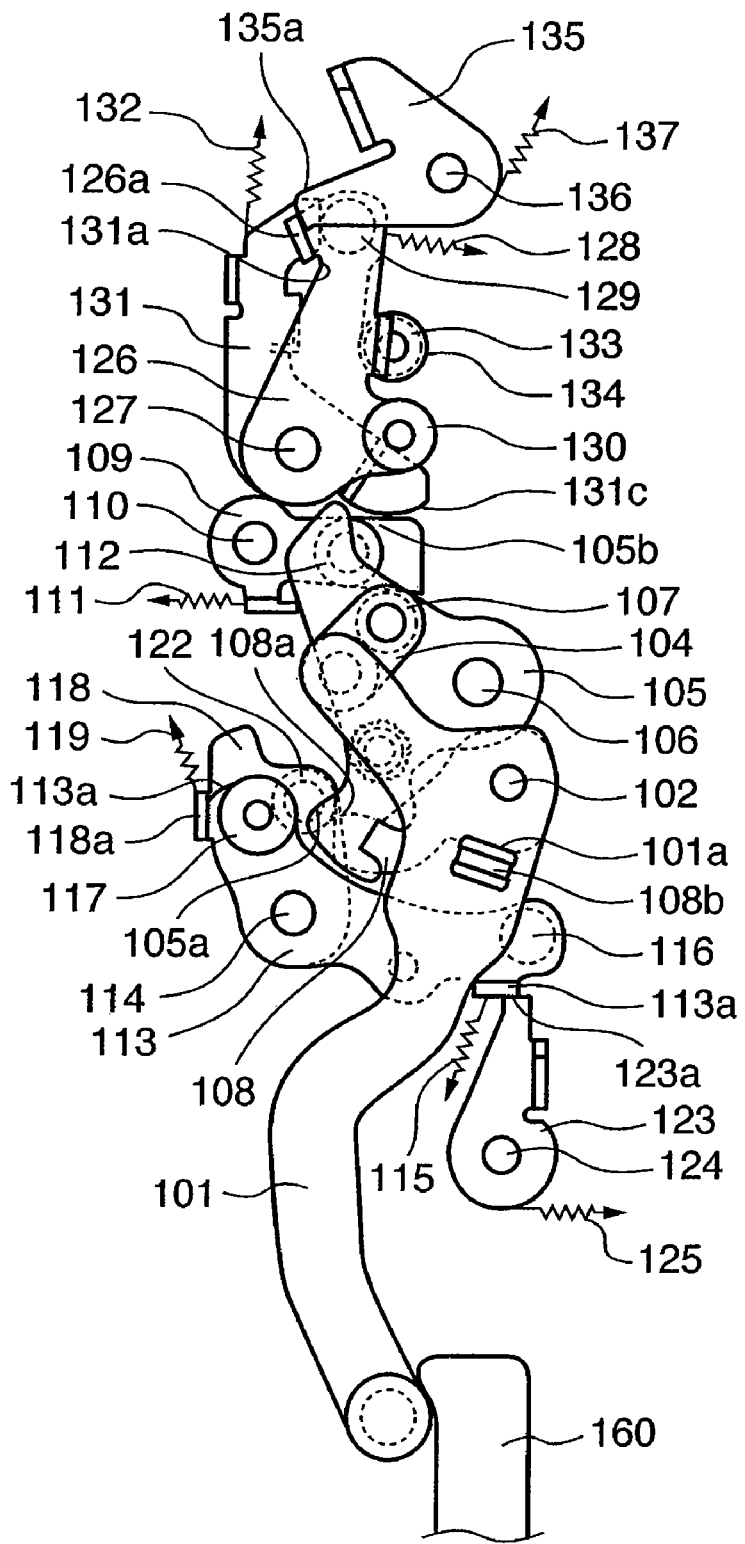
FIG. 10 depicts a plan view of the main portion of a mechanism depicting a state, in which the front driving lever and front sublever are in the loaded position in a camera according to the present embodiment.
Figure 11:
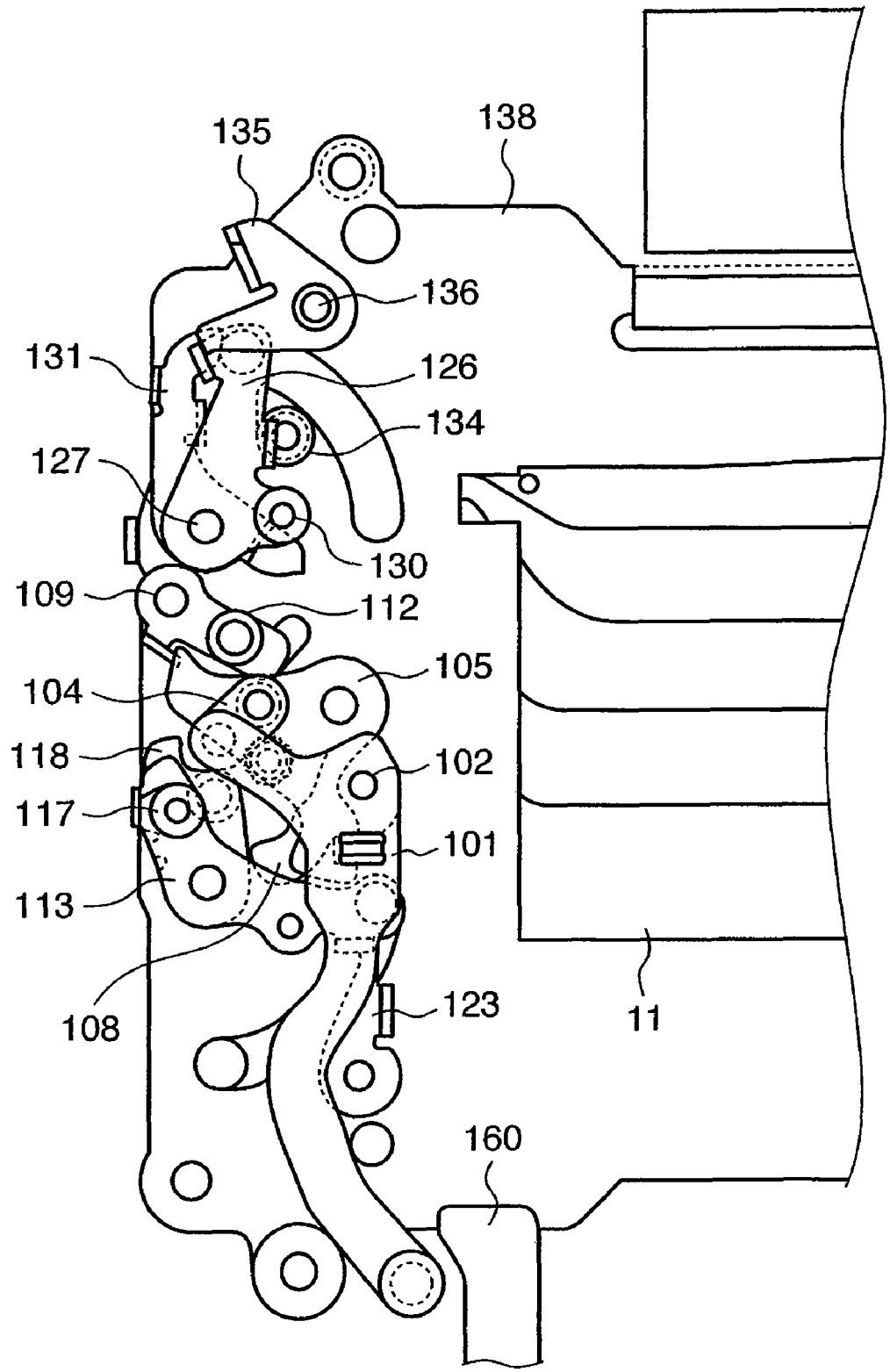
FIG. 11 depicts a top view centered on the driving unit of a loaded shutter unit in a camera according to the present embodiment.

FIG. 8 depicts a plan view of the main portion of a mechanism depicting an overloaded state upon completion of loading. FIG. 9 depicts a plan view of the main portion of a mechanism depicting a state, in which a front driving lever 113 moves from an overloaded position to a loaded position, and a front sublever 118 is in the overloaded position. FIG. 10 depicts a plan view of the main portion of a mechanism depicting a state, in which the front driving lever 113 and front sublever 118 are in the loaded position. Additionally, FIG. 11 depicts a top view centered on the driving unit of the shutter unit in the loaded state. Here, as shown in FIG. 10 and FIG. 11, all members are arranged on top of a shutter base plate 138.

In the drawings, numeral 101 denotes a loading lever driven by a force-transmitting member 160 provided in the camera body. The loading lever 101, which is rotatably supported upon the shaft 102 and, at the same time, has a counterclockwise biasing force applied thereto by a spring (not shown), is arranged so as to rotate between the position shown in FIG. 6 and the position shown in FIG. 8, which are defined by stoppers (not shown). In addition, it has a coupling hole 101a used for rotating the lever jointly with a hereinafter described front loading sublever 108. Component 104, which is a coupling lever rotatably pivotably supported relative to the loading lever 101 and a hereinafter described loading cam lever 105 rotates the loading cam lever 105, in correspondence with the rotation of the loading lever 101. The loading cam lever 105 is rotatably supported upon a shaft 106. When the hereinafter described front driving lever 113 is loaded, a cam 105a at one of the ends of the lever 105 abuts on a roller 117 provided in the front driving lever 113 and loads a hereinafter described front blade (front curtain) driving spring 115. In addition, when a hereinafter described rear driving lever 126 is loaded, a cam 105b at the other end of the loading cam lever 105 abuts on a roller 130 in the rear driving lever 126 and loads a hereinafter described rear blade (rear curtain) driving spring 128. Moreover, a coupling roller 107, which abuts on a hereinafter described rear loading sublever 109, is rotatably pivotably supported upon the loading cam lever 105.

The front loading sublever 108 rotates about the shaft 102, in the same manner as the loading lever 101. The front loading sublever 108 is provided with a cam 108a for loading the hereinafter described front sublever 118, which is used to load a hereinafter described front blade assisting spring 119, and with a coupling section 108b, which is used to rotate it jointly with the loading lever 101, and is connected to a coupling hole 101a in the loading lever 101. Along with being rotatably retained on the shaft 110, the rear loading sublever 109 has a clockwise biasing force applied thereto by a spring 111, thus constantly abutting on the coupling roller 107. Moreover, a rear loading sublever roller 112, which is abuttable on a hereinafter described rear sublever 131, is pivotally supported upon the rear loading sublever 109. A hereinafter described rear blade assisting spring 132 is loaded as a result of the rear loading sublever roller 112 abutting on the rear sublever 131 and moving the rear sublever 131.

The front driving lever 113 is retained rotatably about a shaft 114. In the lever 113, there is provided the front driving lever roller 117, which is abuttable on the cam 105a of the loading cam lever 105, and an engageable portion 113a, which is engaged with a hereinafter described front clamping lever 123, is formed therein as well. A clockwise biasing force is applied to this lever 113 by a first spring, i.e. the front blade driving spring 115. FIG. 6 shows a state, in which the front driving lever 113 is engaged with the hereinafter described front clamping lever 123 and the front curtain 11 occludes the aperture frame of the shutter.

The front sublever 118 is rotatably supported upon the same shaft as the front driving lever 113, with a biasing force applied thereto in the clockwise direction by a second spring, i.e. the front blade assisting spring 119. In FIG. 6, an abutment portion 113c of the front driving lever 113 abuts on an abutment portion 118a of the front sublever 118 and the spring force of the front blade assisting spring 119 is exerted on the front driving lever 113. A stopper portion 118b is provided in the front sublever 118, which rotates in correspondence with the rotation of the front driving lever 113. By abutting on a front stopper 121, which is made up of an elastic member molded from soft plastics or rubber and is provided on a front stopper shaft 120, the stopper portion 118b stops the clockwise rotation of the front sublever 118. A front sublever roller 122 is pivotally supported upon the front sublever 118 and transmits force to the front sublever 118 by abutting on the cam 108a of the front loading sublever 108. The front clamping lever 123, which is a clamping member rotatably supported upon a shaft 124, has a counterclockwise biasing force applied thereto by a spring 125. In the state depicted in FIG. 6, the front clamping lever 123 is adapted to be prevented from further rotation in the counterclockwise direction by a stopper, not shown. Component 123a is an engaging portion, which abuts on the engageable portion 113a of the front driving lever 113 and engages the front driving lever 113 so as to prevent it from rotating in the clockwise direction. The rear driving lever 126 is rotatably supported upon a shaft 127. A rear driving lever roller 130, which abuts on the cam 105b of the loading cam lever 105, is provided in the lever 126. Moreover, an engageable portion 126a (FIG. 7), which is engaged with a hereinafter described rear clamping lever 135, is formed in the lever 126, with a biasing force applied thereto in the clockwise direction by the rear blade driving spring 128. FIG. 6 shows a state, in which the rear driving lever 126 is engaged with the hereinafter described rear clamping lever 135, and the rear curtain 12 has uncovered the aperture frame of the shutter.

The rear sublever 131 is rotatably supported upon the same shaft as the rear driving lever 126, with a clockwise biasing force applied thereto by the rear blade assisting spring 132. In FIG. 6, the abutment portion 131a of the rear sublever 131 abuts on a rear blade driving pin 129 implanted in the rear driving lever 126 and the spring force of the rear blade assisting spring 132 is exerted on the rear driving lever 126. A stopper portion 131b is provided in the rear sublever 131 rotating in correspondence with the rotation of the rear driving lever 126 and abuts on a rear stopper 134, which is made up of an elastic member molded of soft plastics or rubber and is provided on a rear stopper shaft 133. A loading cam 131c is provided in the rear sublever 131 and abuts on the rear loading sublever roller 112 pivotally supported upon the rear loading sublever 109. Additionally, the rear sublever 131 is loaded by the counterclockwise rotational movement of the rear loading sublever 109. Rotatably supported upon a shaft 136, the rear clamping lever 135 has a counterclockwise biasing force applied thereto by a spring 137. In the state depicted in FIG. 6, it is adapted to be prevented from further rotation in the counterclockwise direction by a stopper, not shown. An engaging portion 135a abuts on the engageable portion 126a of the rear driving lever 126 and engages the rear driving lever 126 so as to prevent it from rotating in the clockwise direction.

In addition, in FIG. 5, numeral 141 denotes a magnetized front blade rotor, where a front blade hammer 146, which abuts on the front clamping lever 123, is attached to a rotary shaft. Numeral 142 denotes a front blade stator arranged on a base member 144 and numeral 143 denotes a front blade coil wound around a portion of the front blade stator 142. Numeral 147 denotes a return spring biasing the front blade rotor 141 and the front blade hammer 146 in a predetermined direction. The electromagnetic driving unit mentioned above initiates the movement of the front curtain 11. Moreover, a rear blade rotor, not shown, a rear blade stator 148, a rear blade coil 149, a return spring 151, and a rear blade hammer 150, which abuts on the rear clamping lever 135, act in a similar manner to initiate the movement of the rear curtain 12. A printed circuit board 152 is connected to the front blade coil 143 and rear blade coil 149 and has circuits for energizing and driving the respective coils from the camera body.

Now, when the front blade coil 143 is energized from the camera body by a release operation, a magnetic field is generated in the front blade stator 142 and the front blade rotor 141 rotates against the biasing force of the return spring 147. The rotation of the front blade rotor 141 causes the front blade hammer 146 to abut on and move the front clamping lever 123. As a result, the front driving lever 113 is disengaged, and the front curtain 11 starts moving under the action of the spring force of the front blade driving spring 115 and front blade assisting spring 119. Moreover, when the front blade coil 143 stops being energized from the camera body, the front blade rotor 141 and front blade hammer 146 are returned to their prescribed positions by the biasing force of the return spring 147.

After an elapse of a predetermined time from the start of travel of the front curtain 11, the rear blade coil 149 is energized. As a result, the rear blade rotor (not shown) rotates and the rear blade hammer 150 abuts on and moves the rear clamping lever 135. Consequently, the rear driving lever 126 is disengaged, and the rear curtain 12 starts moving under the action of the spring force of the rear blade driving spring 128 and rear blade assisting spring 132. The release operation of the shutter unit is carried out independently by the front curtain 11 and by the rear curtain 12 using a plurality of electromagnetic driving units.

In the above-described construction, in the shooting-enabled standby state shown in FIG. 6, the coils 143 and 149 of the above-described respective electromagnetic driving units are energized with proper timing by the camera body to rotate the hammers 146 and 150. As a result, the front clamping lever 123 and rear clamping lever 135 are rotated in the clockwise direction and the engagement of the front driving lever 113 and rear driving lever 126 is successively released. In this manner, the front driving lever 113 and front sublever 118 first jointly move the front curtain 11 from a closed position to an open position with the help of the front blade driving pin 116 under the action of the biasing force of the front blade driving spring 115 and front blade assisting spring 119. In the process, the stopper portion 118b of the front sublever 118 abuts on the front stopper 121. The sound is muffled and the impact cushioned as it finally abuts on the front stopper shaft 120, which precisely defines the range of action of the front blade assisting spring 119. This causes the biasing force of the front blade assisting spring 119, which acts on the front driving lever 113, to disappear and results in the front driving lever 113 being driven towards the location of a stopper (not shown) that defines the open position by the front blade driving spring 115 alone. It should be noted that no problems in operation arise even if the front stopper 121 that cushions the impact and provides muffling is eliminated by adapting the front sublever 118 to directly abut on the front stopper shaft 120.

Subsequently, the rear driving lever 126, acting jointly with the rear sublever 131, moves the rear curtain 12 from the open position to the closed position with the help of the rear blade driving pin 129 under the action of the biasing force of the rear blade driving spring 128 and rear blade assisting spring 132. In the process the stopper portion 131b of the rear sublever 131 abuts on the rear stopper 134 and finally abuts on the rear stopper shaft 133, with the impact cushioned and the sound muffled. The range of action of the rear blade assisting spring 132 is thus precisely defined, causing the biasing force of the rear blade assisting spring 132, which acts on rear driving lever 126, to disappear and resulting in the rear driving lever 126 being driven to the location of the stopper (not shown) that defines the closed position by the rear blade driving spring 128 alone. In this manner, the exposure operation (shooting operation) is terminated and the camera enters the state of FIG. 7. It should be noted that no operating problems arise even if the rear stopper 134 that cushions the impact and provides muffling is eliminated by adapting the rear sublever 131 to directly abut on the rear stopper shaft 133.

To produce the shooting-enabled state from the state of FIG. 7 (immediately after shooting), the loading lever 101 is rotated in the clockwise direction. Concomitantly therewith, the loading cam lever 105 also rotates in the clockwise direction through the medium of the coupling lever 104. As a result of the clockwise rotation of the loading cam lever 105, the cam 105a abuts on the front driving lever roller 117 and rotates the front driving lever 113 in the counterclockwise direction. Thus, the loading of the first spring 115 starts and the front curtain 11 begins its movement to the closed position.

Moreover, the front loading sublever 108, which is integrally fitted to the loading lever 101, also rotates in the clockwise direction, with the cam 108a abutting on the front sublever roller 122 and rotating the front sublever 118 in the counterclockwise direction. The loading of the front blade assisting spring 119 starts as a result of the counterclockwise rotation of the front sublever 118. Moreover, substantially simultaneously therewith, the rear loading sublever 109, which abuts on the coupling roller 107, is rotated in the counterclockwise direction. As a result, the rear loading sublever roller 112 provided in the rear loading sublever 109 abuts on the loading cam 131c and the rear loading sublever 131 starts rotating in the counterclockwise direction. This starts the loading of the rear blade assisting spring 132. In other words, the loading of the front blade driving spring 115, front blade assisting spring 119, and rear blade assisting spring 132 starts almost simultaneously.

In addition, when the loading lever 101 is rotated in the clockwise direction, the cam 105*b* of the loading cam lever 105 abuts on the rear driving lever roller 130 provided in the rear driving lever 126 and rotates the rear driving lever 126 in the counterclockwise direction. The rotation of the rear driving lever 126 initiates the loading of the rear blade driving spring 128.

It should be noted that in this embodiment, a construction is used wherein the front curtain 11 and rear curtain 12 are retracted to the shooting-ready positions while maintaining a portion of constant overlap between the rear curtain 12 and front curtain 11 for the purpose of preventing unwarranted exposure during the loading operation. Therefore, in this configuration the rotation of the rear driving lever 126 starts with a delay relative to the start of rotation of the front driving lever 113. As a result, the loading of the rear blade driving spring 128 starts with a delay relative to the start of loading of the front blade driving spring 115, front blade assisting spring 119, and rear blade assisting spring 132.

Next, when the loading lever 101 is rotated further, the engageable portion 113*a* of the front driving lever 113 is engaged with the engaging portion 123*a* of the front clamping lever 123. Moreover, when the loading lever 101 is rotated further, the engageable portion 126*a* of the rear driving lever 126 is engaged with the engaging portion 135*a* of the rear clamping lever 135.

FIG. 8 shows an overloaded state, wherein the loading lever 101 abuts on a stopper (not shown) and the front driving lever roller 117 and rear driving lever roller 130 respectively reach the cam tops 105*a*' and 105*b*' of the loading cam lever 105. In this state, the engageable portion 113*a* of the front driving lever 113 surmounts the engaging portion 123*a* of the front clamping lever 123 and the engageable portion 126*a* of the rear driving lever 126 surmounts the engaging portion 135*a* of rear clamping lever 135. Namely, FIG. 8 shows an overloaded state, in which the front driving lever 113, front sublever 118, rear driving lever 126, and rear sublever 131 are moved farther than their respective loaded positions (exposure start point) illustrated in FIG. 6. Moreover, at such time, the front sublever 118 is positioned at a distance 1S from the abutment portion 113*c* of the front driving lever 113 and the front sublever 131 is positioned at a distance 1A from the rear blade driving pin 129.

FIG. 9 and FIG. 10 explain how the supply of motive force from the power transmitting member 160 of the camera body in the state of FIG. 8 is terminated and the loading lever 101 is pushed in the direction of the initial position depicted in FIG. 6 by the biasing force of the front blade assisting spring 119 and rear blade assisting spring 132.

The shape of the cam 108*a* of the front loading sublever 108 intended for the loading of the front sublever 118 and the shape of the loading cam of the rear sublever 131 intended for the loading of the rear sublever 131 enables the biasing force of the front blade assisting spring 119 and rear blade assisting spring 132 to act so as to push the loading lever 101 back in the direction of the initial position depicted in FIG. 6.

FIG. 10 illustrates a state, in which the loading lever 101 has been pushed back by the biasing force of the front blade assisting spring 119 and rear blade assisting spring 132. In FIG. 10, the front driving lever roller 117, which is pivotally supported upon the front driving lever 113, has been removed from the cam top 105*a*' of the loading cam lever 105 and the rear driving lever roller 130, which is pivotally supported upon the rear driving lever 131, has been removed from the cam top 105*b*' of the loading cam lever 105. At such time, the front driving lever 113 moves to the loaded position (exposure start point), wherein it is engaged with the front clamping lever 123 by the biasing force of the front blade driving spring 115. Moreover, the rear driving lever 126 moves to the loaded position (exposure start point), wherein it is engaged with the rear clamping lever 135 by the biasing force of the rear blade driving spring 128.

Moreover, the front sublever 118 is in a state, wherein it is overloaded by a space 1S, and the rear sublever 131 moves to the loaded position (exposure start point), where the abutment portion 131*a* abuts on the rear blade driving pin 129 implanted in the rear driving lever 126.

In FIG. 10, the front sublever 118 moves from the state of FIG. 9 by the above-mentioned space 1S and is engaged in the loaded position (exposure start point) by abutting on the abutment portion 113*c* of the front driving lever 113. In other words, both the front driving lever roller 117 and rear driving lever roller 130 are removed from the cam tops 105*a*' and 105*b*' of the loading cam lever 105 by the biasing force of the front blade assisting spring 119 produced when the front sublever 118 is displaced by the space 1S.

The exposure operation of the shutter in this embodiment is carried out by driving the front curtain 11 using the front blade driving spring 115 and front blade assisting spring 119 as well as driving the rear curtain 12 using the rear blade driving spring 128 and rear blade assisting spring 132. Additionally, the biasing force of the front blade assisting spring 119 and rear blade assisting spring 132 is adapted to act only during the initial driving stages of the respective curtains (blades). When the movement of the curtains (blades) starts, the curtains (blades) can be accelerated to the desired curtain speed within a short period of time using a strong spring force (front blade driving spring 115+front blade assisting spring 119, rear blade driving spring 128+rear blade assisting spring 132). In addition, since inertia forces work after a prescribed curtain speed is reached, the curtain speed can be maintained with a comparatively weak spring force (front blade driving spring 115 and rear blade driving spring 128) without requiring a powerful accelerating force.

Next, explanations are provided regarding the mechanism used in this embodiment to obviate the likelihood that dust adhered to shutter blades might adhere to the optical filter by using the overloadable shutter of the above-mentioned construction. It is appreciated that, based on the above description and as shown in FIG. 8 to FIG. 11 described above, the overloading operation of the shutter is not accompanied by any opening/closing operation of the front curtain 11 and rear curtain 12 of the shutter. Moreover, this overloading operation slightly rotates the loading cam lever 105 of the front curtain in the counterclockwise direction and, as a result of this slight rotatary action, the front curtain 11, which is actuated by the loading cam lever 105, can be slightly vibrated.

In this embodiment, the vibration of the front curtain 11 dislodges dust adhered to the front curtain 11 of the shutter from the front curtain 11 while prohibiting the opening/closing operation of the shutter during a fixed period of time from the start of the shutter overloading operation. As a result, it is adapted to prevent dust dislodged from the front curtain 11 and floating in the air from adhering to the optical element 21.

The electrical configuration used to operate the camera 500 of the above-mentioned construction is explained next.

Figure 12:
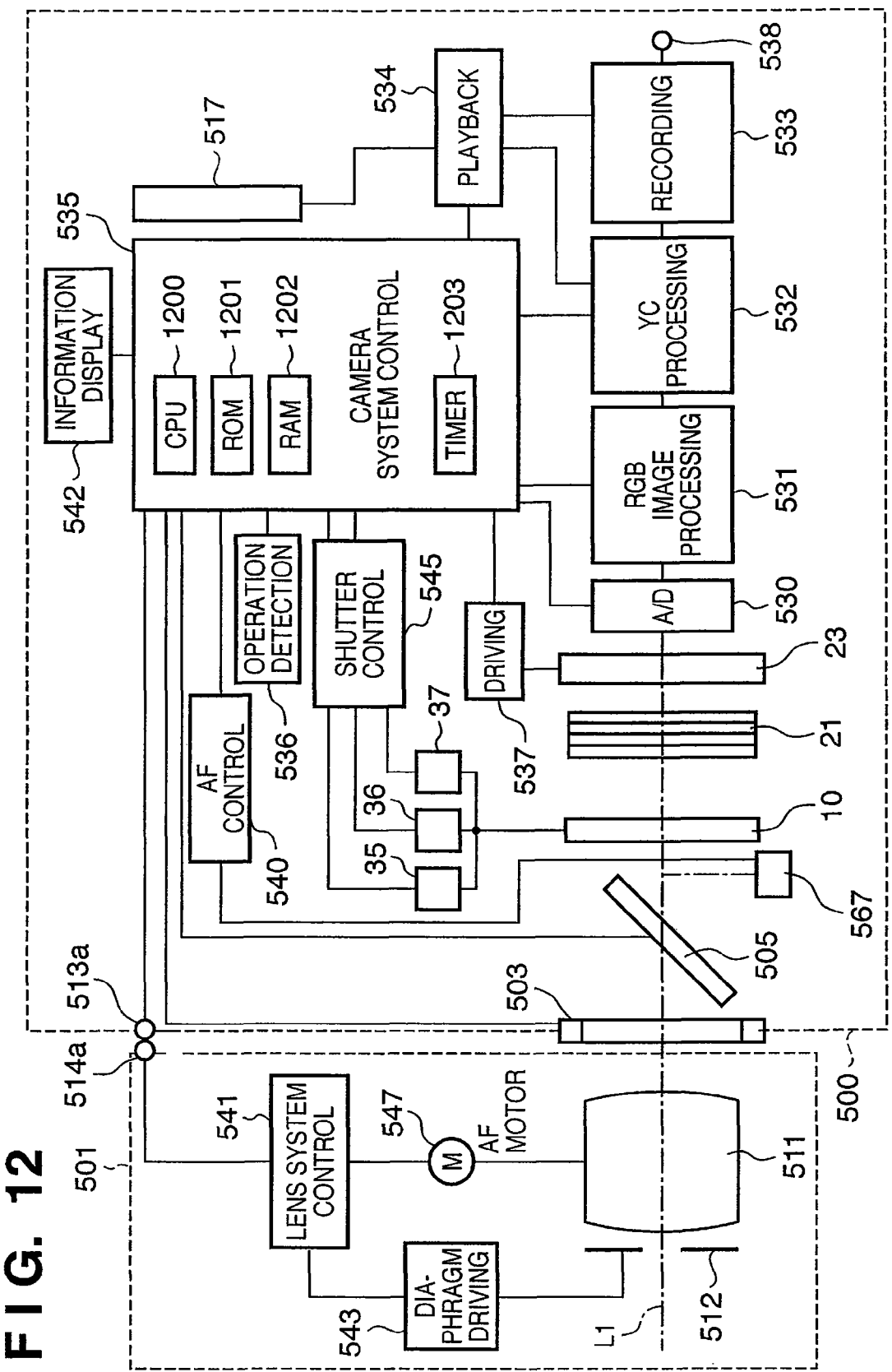
FIG. 12 is a block diagram illustrating the electrical configuration of a camera system used in a camera according to the present embodiment.

FIG. 12 is a block diagram illustrating the electrical configuration of the camera system of the camera 500 according to the present embodiment. Here, like reference numerals are assigned to like members explained in the above-described drawings. The explanation starts from the portions related to the recording and sensing of object images.

The camera system has an image sensing system, an image processing system, a recording/playback system, and a control system. The image sensing system has an optical imaging system 511 and the solid-state image sensing unit 23. The image processing system has an A/D converter 530, an RGB image processing circuit 531, and a YC processing circuit 532. Moreover, the recording/playback system has a recording processing circuit 533 and a playback processing circuit 534. In addition, the control system has a camera system control circuit (controller) 535, an operation detection circuit 536, and an image capture driving circuit 537. Reference numeral 538 denotes a connection terminal connected to an external computer etc. and satisfying standard requirements for sending and receiving data. The electrical circuits mentioned above are driven by receiving electric power supply from a battery, not shown.

The image sensing system is an optical processing system forming images from light coming from an object on the image-sensing surface of the solid-state image sensing unit 23 via the optical imaging system 511. An appropriate quantity of object light can be received by the solid-state image sensing unit 23 based on controlling the driving of a diaphragm 512, which is provided in the optical imaging system 511, and, if necessary, by driving the focal plane shutter 10 through a shutter control circuit 545.

Signals read by the solid-state image sensing unit 23 are supplied to the image processing system through the A/D converter 530. Image data is generated as a result of image processing in the image processing system. The A/D converter 530 is a signal converter circuit that converts e.g. the output signals of the solid-state image sensing unit 23 into 10-bit digital signal in accordance with the amplitude of the signals read from each pixel of the solid-state image sensing unit 23 and outputs them, executing the following image processing by means of digital processing. The RGB image processing circuit 531, which is a signal processing circuit used to process the output signals of the A/D converter 530, has a white balance circuit, a gamma correction circuit, and an interpolation computing circuit for increasing resolution by carrying out interpolation operations. The YC processing circuit 532 is a signal processing circuit generating a luminance signal Y and color difference signals (R−Y) and (B−Y). This YC processing circuit 532 has a high pass luminance signal generation circuit generating a high pass luminance signal YH, a low luminance signal generation circuit generating a low luminance signal YL, and a color difference signal generation circuit generating the color difference signals (R−Y) and (B−Y). The luminance signal Y is formed by synthesizing the high pass luminance signal YH and low pass luminance signal YL.

The recording/playback system is a processing system, which outputs image signals to a memory (not shown) and outputs image signals to a display unit 517. The recording processing circuit 533 carries out processing required to write and read image signals to the memory and the playback processing circuit 534 reproduces image signals read from the memory and outputs them to a display unit 517. Moreover, inside the recording processing circuit 533, there is a compression/decompression circuit which, along with compressing YC signals representing still picture data and moving picture data to a prescribed compression format, also decompresses the compressed data. The compression/decompression circuit has a frame memory, etc. for signal processing, during which YC signals originating from the image processing system are accumulated in the frame memory on a frame-by-frame basis, with the accumulated signals read from each block of a plurality of blocks and subjected to compression encoding. The compression encoding is carried out, for instance, by performing a 2-dimensional orthogonal transform, normalization, and Huffman encoding on the image signal of each block.

The playback processing circuit 534 is a circuit that subjects the luminance signal Y and color difference signals (R−Y) and (B−Y) to a matrix transformation to convert them, for instance, into RGB signals. The signals converted by the playback processing circuit 534 are output to the display unit 517 and displayed (reproduced) as a visible image. The playback processing circuit 534 and display unit 517 may be connected via wireless communication such as Bluetooth. This construction makes it possible to monitor images captured by the camera 500 from a remote location.

On the other hand, the operation detection circuit 536 provided in the control system detects operations carried out using the main switch, release button, and mode changeover switch (not shown) and outputs the detection results to the camera system control circuit 535. The camera system control circuit 535 has a microcomputer or another CPU 1200, a ROM 1201, which stores data and programs executed by the CPU 1200, as well as a RAM 1202, which is a work area used for temporarily storing various data. A timer 1203 measures the passage of time specified by the CPU 1200 and notifies the CPU 1200 that the specified time has elapsed using an interrupt etc. Upon receiving a detection signal from the operation detection circuit 536, the camera system control circuit 535 carries out the action corresponding to the detection results. In addition, the camera system control circuit 535 generates a timing signal used when an image sensing operation is performed and outputs it to the image capture driving circuit 537. By receiving a control signal from the camera system control circuit 535, the image capture driving circuit 537 generates a driving signal used to drive the solid-state image sensing unit 23. The information display circuit 542 receives a control signal from the camera system control circuit 535 and controls the driving of the information display unit of the optical viewfinder 502. This control system controls the driving of the image sensing system, the image processing system, and the recording/playback system in response to the manipulation of various switches provided in the camera 500. For instance, when SW2 is turned on by operating the release button (not shown), the control system (camera system control circuit 535) exercises control over the driving of the solid-state image sensing unit 23, the operation of the RGB image processing circuit 531, and the compression processing of the recording processing circuit 533, etc. In addition, the control system changes the display (the state of display segments) in the optical viewfinder 502 by controlling the driving of the information display unit in the optical viewfinder via the information display circuit 542.

The focusing action of the optical imaging system 511, which is constituted by a shooting lens, is explained next.

The camera system control circuit 535 is connected to an AF control circuit 540. Moreover, when a lens unit 501 is mounted to the camera 500, the camera system control circuit 535 is connected to a lens system control circuit 541 in the lens unit 501 via mount contacts 513*a* and 514*a*. In addition, the AF control circuit 540 and lens system control circuit 541 carry out mutual communication of data required for specific processes with the camera system control circuit 535.

Focus detecting unit 567 outputs detection signals from focus detection areas provided in prescribed locations on the picture screen to the AF control circuit 540. The AF control circuit 540 generates a focus detection signal based on the output signal of the focus detecting unit 567 and detects the focusing state (defocusing amount) of the optical imaging system 511. The AF control circuit 540 then converts the detected defocusing amount to the amount of driving of the focusing lens, which forms part of the optical imaging system 511, and transmits information concerning the amount of driving of the focusing lens to the lens system control circuit 541 via the camera system control circuit 535. Here, when focusing on a moving object, the AF control circuit 540 estimates an appropriate stop position for the focusing lens with account taken of the time lag between fully depressing the release button (not shown) and the start of actual image sensing control. Information on the amount of driving of the focusing lens up to the estimated stop position is then transmitted to the lens system control circuit 541.

On the other hand, in a case where the camera system control circuit 535 uses the output signal of the solid-state image sensing unit 23 and determines that the brightness of the object is low and sufficient focus detection accuracy is not obtained, the object is illuminated by driving a flashlight-emitting unit (not shown), a fluorescent tube, or a white LED (not shown) provided in the camera 500. Upon receiving information on the amount of driving of the focusing lens from the camera system control circuit 535, the lens system control circuit 541 controls the rotation of the AF motor 547 disposed in the lens unit 501. As a result, the optical imaging system 511 can be kept in focus by moving the focusing lens in the direction of the optical axis L1 by the amount of drive with the help of a driving mechanism. Moreover, upon receiving information on the exposure value (aperture value) from the camera system control circuit 535, the lens system control circuit 541 operates the diaphragm 512 so as to set it to a diaphragm aperture diameter corresponding to the aperture value by controlling the driving of the diaphragm-driving actuator 543 of the lens unit 501.

Moreover, upon receiving information on the speed of the shutter from the camera system control circuit 535, the shutter control circuit 545 controls an electromagnetic driving unit 36 of the rear curtain 12 and an electromagnetic driving unit 35 of the front curtain 11 of the focal plane shutter 10. As a result, the front curtain 11 and rear curtain 12 are actuated at the specified shutter speed. In addition, shutter loading, as an operation performed in preparation for operating the shutter, is carried out by operating a driving unit 37. Moreover, overloading, which is the characteristic operation of the present embodiment, can also be carried out by the driving unit 37. Thus, the operation of the focal plane shutter 10 and diaphragm 512 permits an appropriate quantity of light from a photographic object to be projected onto the image-forming surface of the solid-state image sensing device 23b of the solid-state image sensing unit 23.

Moreover, when the AF control circuit 540 detects that the object is in focus, this information is transmitted to the camera system control circuit 535. If SW2 is turned on by fully depressing the release button (not shown) at such time, a shooting operation is carried out by the image sensing system, image processing system, and recording/playback system as described above.

The operation of the camera (optical device) equipped with a mechanism for removing dust adhered to the focal plane shutter 10, which constitutes the underlying basis of this embodiment, is explained below by referring to the flow chart shown in FIG. 13.

Figure 13:
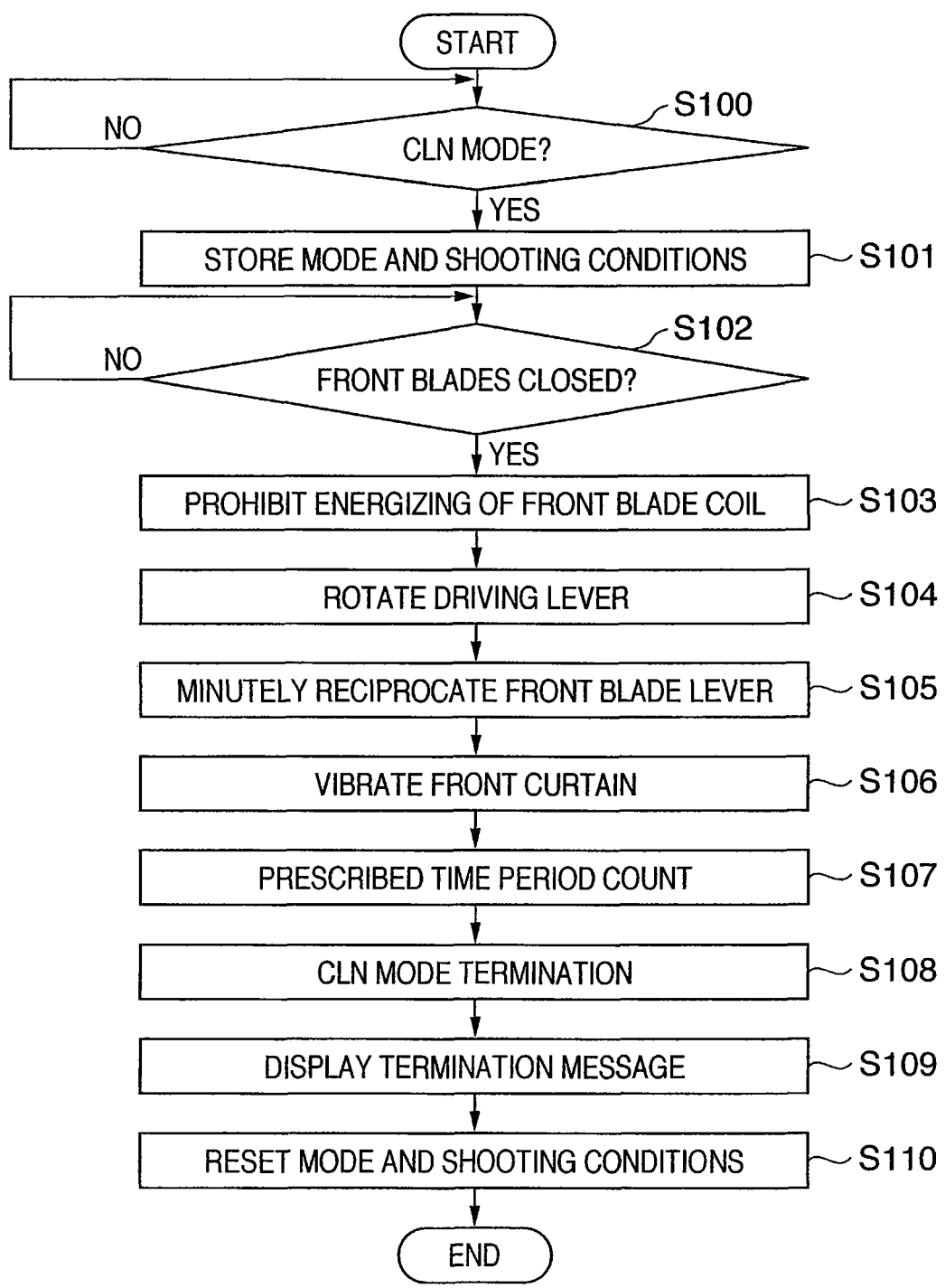
FIG. 13 is a flow chart explaining control processing performed by a camera system controller in a camera according to a first embodiment of the present invention.

FIG. 13 is a flow chart used to explain control processing performed by the camera system control circuit 535 of the camera 500 according to the first embodiment of the present invention. The program executing such processing is stored in the ROM 1201 of the camera system control circuit 535 and is executed under the control of the CPU 1200.

First of all, in Step S100, it is determined whether the mode selector switch on the control portion of the camera 500 has been operated and the cleaning (CLN) mode has been specified. Here, if it is determined that the cleaning mode has been specified, the process advances to Step S101. On the other hand, if it is determined that this is not the cleaning mode, the process goes back to the previous Step S100, and a determination is made again as to whether the cleaning mode has been specified. In Step S101, prior to going into the cleaning mode, the shutter speed, aperture value, and other shooting conditions preset in the camera 500 are stored in the RAM 1202 of the camera system control circuit 535 and the process advances to Step S102. In Step S102, detection means (not shown) provided in the focal plane shutter 10 is used to determine whether all the shutter blades 11a to 11d of the front curtain 11 have been closed and deactivated. If the front curtain 11 has not been completely closed for some reason, the driving unit 37 is driven to operate the shutter driving lever 101 and close the front curtain 11. Then, if it is determined that all the shutter blades 11a to 11d of the front curtain 11 have been closed and deactivated, the process advances to Step S103.

If the front curtain 11 of the shutter is inadvertently operated while in the cleaning mode, the shutter may open and dust may adhere to the optical element 21. For this reason, to prevent the front curtain 11 of the shutter from inadvertent malfunction, in Step S103, the energizing of the front blade coil, which initiates the driving of the front curtain 11, is prohibited. Next, the process advances to step S104 and a command to execute the overloading operation of the focal plane shutter 10 is issued from the camera system control circuit 535 to the shutter control circuit 545. Based on this signal, the driving unit 37 is driven by the shutter control circuit 545. Here, rotating the driving lever 160 carries out a shutter overloading operation with respect to the already loaded shutter.

Next, the process advances to Step S105 and the action of the driving lever 160 rotated in the previous Step S104 is transmitted to the front blade lever 101. Since the shutter is already in the loaded or overloaded state during this operation, it starts minutely reciprocating between the overloaded position and the loaded position of the shutter. In this state, there is no need for shutter blade loading and, if an overloading operation has been completed in advance, blade loading for the purpose of overloading is not necessary either. Thus, all of the force of the driving lever 160 can be utilized for this minute reciprocating action, such that high-speed reciprocating action becomes possible.

Next, in Step S106, the minute reciprocating action of the front blade lever 101 obtained in Step S105 is converted into the vibration of the front curtain 11. Namely, the front blade lever 101, which was caused to minutely reciprocate in Step S105, transmits this motive force to the front curtain 11. However, at this point in time the front curtain 11 is extended in the closed state of the shutter and performs no action in terms of opening/closing operation and, the motive force is transmitted as an additional force hitting the stopper to further close the shutter. The reaction force produced thereby is transmitted to the front curtain 11, which cooperate with the front blade lever 101, and causes the shutter blades 11a to 11d to vibrate. The vibration of the shutter blades 11a to 11d causes the dust adhered to the focal plane shutter 10 to be dislodged.

Next, the process advances to Step S107 and a timer 1203 provided in the camera system control circuit 535 is used to measure a predetermined time period. This is done to prevent dust floating in the air from adhering to the surface of the optical element 21 when the opening/closing operation of the front curtain 11 is performed while dust dislodged from the surface of the front curtain 11 in Step S106 is floating in the air around the focal plane shutter 10. Thus, the predetermined time period is set in advance to a time period during which the dust floating in the air is expected to completely fall to the bottom and stop drifting around. Specifically, the time it takes dust to fall to the bottom, depending on the size of the dust that is believed to affect captured images if the dust adheres to the surface of the optical element 21, is measured and the predetermined time period is set based on that time. The size of one pixel in the solid-state image sensing device 23b and the distance between the optical element 21 and the solid-state image sensing device 23b determine whether captured images are affected when dust adheres to the surface of the optical element 21. Therefore, the predetermined time period is characterized by being inherent in each type of camera.

Thus, in Step S107, the process waits until the dust completely falls to the bottom by the vibration of the front curtain 11 and stops drifting around and then advances to Step S108, terminating the cleaning mode. Next, in Step S109, a message to the effect that the cleaning mode has been terminated (or that the cleaning operation has been completed) is displayed on the display unit 517. Subsequently, in Step S110, the shooting conditions etc. stored in the RAM 1202 in Step S101 are read out and reset again in the camera 500, thereby completing the sequence.

As explained above, according to the first embodiment, it is possible to provide an optical device, in which dust adhered to the front curtain 11 (front blades) of the focal plane shutter can be removed without applying additional force. Moreover, since there is no need for complex shutter operations, the release time lag is not increased more than necessary and operability during shooting is not adversely affected.

It should be noted that the above-mentioned first embodiment described a construction, in which the movement of the front blade driving lever 101 was provided by operation of the shutter driving unit 37. The embodiment implements a novel construction for vibrating the front curtain 11 without the addition of new components. However, the present invention is not limited to the above-mentioned construction. In other words, the front curtain 11 may be adapted to vibrate using a construction, wherein the shutter-loading action is partially transmitted to the front curtain 11 and the force of the driving unit 37 is transmitted directly without using the front blade driving lever 101.

Moreover, in the above-mentioned first embodiment, the timing of dislodging the dust adhered to the front curtain 11 of the focal plane shutter 10 is set to be performed during the time period set for the cleaning mode. However, there is no need to have such a special cleaning mode and dust adhered to the front curtain of the focal plane shutter may be removed at any time. For instance, the shutter overloading operation may be executed when changing shooting lenses because dust tends to easily penetrate from the outside at such time. In addition, it may be adapted to automatically enter cleaning mode whenever the digital camera is turned on or upon elapse of a given period of use. The above-described effects can be produced by doing so without setting up a special cleaning mode.

Embodiment 2

Figure 14:
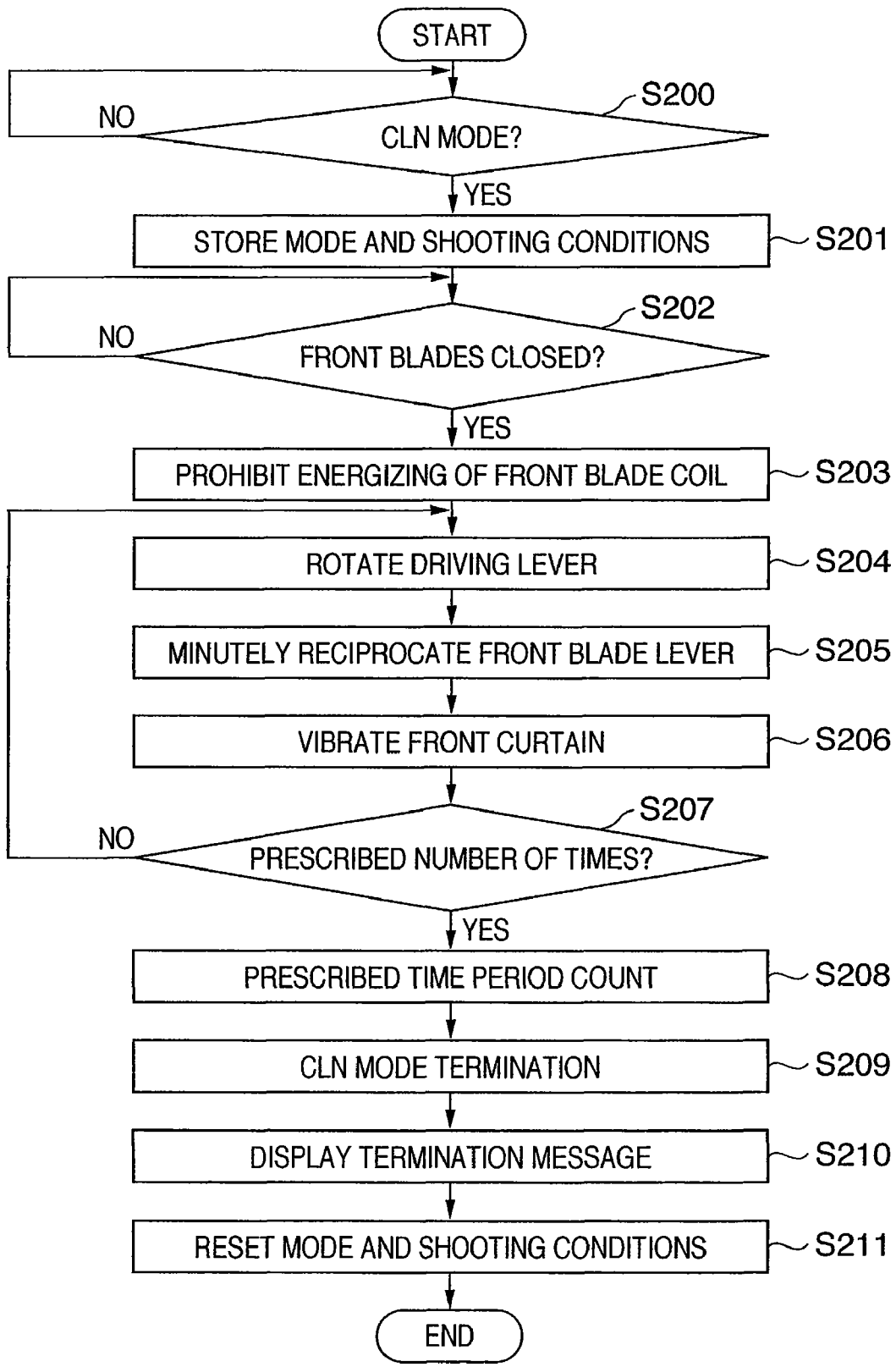
FIG. 14 is a flow chart explaining control processing performed by a camera system controller of a camera according to a second embodiment of the present invention.

FIG. 14 is a flow chart used to explain control processing performed in a second embodiment of the present invention by the camera system control circuit 535 of the camera 500 equipped with a mechanism for eliminating dust adhered to the focal plane shutter 10. The program executing such processing is stored in the ROM 1201 of the system control circuit 535 and is executed under the control of the CPU 1200. It should be noted that the construction of the camera in the second embodiment is the same as in the first embodiment, and the only difference consists in the operations performed to remove dust adhered to the focal plane shutter 10. For this reason, explanations are provided by designating common parts using the same reference numerals.

The second embodiment is characterized in performing the shutter overloading operation several times in succession. By doing so, dust adhered to the front curtain 11 of the focal plane shutter can be dislodged in a more reliable manner. The second embodiment is explained below by referring to the flow chart. It should be noted that because the operation of Steps S200 to S203 in FIG. 14 is the same as the processing of Steps S100 to S103 in FIG. 13, their explanation is herein omitted.

In Step S204, a command to perform the overloading of the focal plane shutter 10 is issued from the camera system control circuit 535 to the shutter control circuit 545. The driving unit 37 is driven based on this signal. As a result, the driving lever 160 is rotated and a shutter overloading operation is executed with respect to the already loaded shutter. In Step S205, the action of the driving lever 160 rotated in Step S204 is transmitted to the front blade lever 101. Because the shutter is already in a loaded or overloaded state, as a result of this operation, it starts minutely reciprocating between the overloaded position and the loaded position of the shutter. In this state, there is no need for shutter blade loading and, if overloading has been completed in advance, blade loading for the purpose of overloading is not necessary either. Therefore, all of the force of the driving lever 160 can be utilized for this minute reciprocating action, such that high-speed reciprocating action becomes possible.

Next, in Step S206, the minute reciprocating action of the front blade lever 101 obtained in Step S205 is converted into the vibration of the front curtain 11. Namely, the front blade lever 101, which was caused to minutely reciprocate in Step S205, transmits this motive force to the front curtain 11. Here, the front curtain 11 is already in the closed state and performs no action in terms of opening/closing operation and, the motive force is transmitted as an additional force hitting the stopper to further close the shutter. The reaction force produced thereby is transmitted to the front curtain 11, which cooperates with the front blade lever 101, and causes the shutter blades 11a to 11d to vibrate. The vibration of the shutter blades 11a to 11d causes the dust adhered to the focal plane shutter 10 to be dislodged.

Next, in Step S207, it is determined whether the above-described shutter overloading operation has been repeated a predetermined number of times. The second embodiment is adapted to permit repeated execution of the overloading operation for a predetermined number of times (e.g. 3 times) in order to remove dust adhered to the focal plane shutter 10. Thus, it differs from the first embodiment in its ability to reliably remove even strongly adhered dust from the front curtain 11.

In this manner, upon termination of a predetermined number of overloading operations, the process advances to Step S208 and a predetermined time period is measured by the timer 1203 provided in the camera system control circuit 535. This is done to prevent dust from adhering to the surface of the optical element 21 when the opening/closing operation of the front curtain 11 is performed while dust dislodged from the surface of the shutter blades 11 in Step S206 is floating in the air around the focal plane shutter 10.

Next, the process advances to Step S209 and the program waits until the dust completely falls to the bottom by the vibration of the front curtain 11 in Step 208 and stops drifting around, whereupon the cleaning mode is terminated. Simultaneously, in Step S210, a message to the effect that the cleaning mode has been terminated (or that the cleaning operation has been completed) is displayed on the display unit 517. Subsequently, in Step S211, the shooting conditions etc. stored in the RAM 1202 in Step S201 are read out and reset again in the camera 500, thereby completing the sequence.

As explained above, according to the second embodiment, it is possible to provide an optical device, in which dust adhered to the front curtain 11 of the focal plane shutter 10 can be more reliably removed without applying additional force.

Moreover, since there is no need for complex shutter operations, the release time lag is not increased more than necessary and operability during shooting is not adversely affected.

It should be noted that in the second embodiment, the number of repeated operations used to remove dust adhered to the front curtain 11 of the focal plane shutter 10 by driving the shutter driving unit 37 is a preset number. This number may be adapted to be set in an arbitrary fashion. The number may also be set by the user, according to circumstances.

In addition, although the second embodiment, in the same manner as in the above-described first embodiment, describes a construction for implementing the invention without adding any new components used to vibrate the front curtain 11, the present embodiment may be adapted to directly transmit part of the overloading action to the front curtain 11.

Embodiment 3

FIG. 15 is a flow chart used to explain control processing performed by the camera system controller 535 of the camera 500 according to a third embodiment of the present invention. The program executing such processing is stored in the ROM 1201 of the system controller 535 and is executed under the control of the CPU 1200. It should be noted that the construction of the camera in the third embodiment is the same as in the first embodiment, and the only difference consists in the operations performed to remove dust adhered to the focal plane shutter 10. For this reason, explanations are provided by designating common parts using the same reference numerals.

The characteristic feature of the third embodiment consists in actuating the main mirror 505 after performing the shutter overloading operation. This arrangement is notable in its ability to dislodge dust adhered to the front curtain 11 of the focal plane shutter 10 by performing a shutter overloading operation and then reliably move the dust away from the optical element 21 and discharge it. The operation of the digital single-lens reflex camera of the third embodiment is explained below by referring to the flow chart. It should be noted that because the operation of steps S300 to S303 in FIG. 15 is the same as that of steps S100 to S103 in FIG. 13, their explanation is herein omitted.

In Step S304, a command to perform the overloading of the focal plane shutter 10 is issued from the camera system control circuit 535 to the shutter control circuit 545. The driving unit 37 is driven based on this signal. As a result, by rotating the driving lever 160, a shutter overloading operation is performed with respect to the already loaded shutter.

Next, control passes to Step S305 and the action of the driving lever 160 rotated in the previous Step S304 is transmitted to the front blade lever 101. Since the shutter is already in the loaded or overloaded state at such time, it starts minutely reciprocating between the overloaded position and the loaded position of the shutter. In this state, there is no need for shutter blade loading. In addition, if an overloading operation has been completed in advance, blade loading for the purpose of overloading is not necessary either and therefore all of the force of the driving lever 160 can be utilized for this minute reciprocating action, such that high-speed reciprocating action becomes possible. Next, in Step S306, the minute reciprocating action of the front blade lever 101 obtained in Step S305 is converted into the vibration of the front curtain 11. Namely, the front blade lever 101, which was caused to minutely reciprocate in Step S305, transmits this motive force to the front curtain 11. Here, the front curtain 11 is already in the closed state and performs no action in terms of opening/closing operation and, the motive force is transmitted as an additional force hitting the stopper to further close the shutter. The reaction force produced thereby is transmitted to the front curtain 11, which cooperates with the front blade lever 101, and causes the shutter blades 11a to 11d to vibrate. The vibration of the shutter blades 11a to 11d causes the dust adhered to the focal plane shutter 10 to be dislodged.

Next, the process advances to Step S307, and the main mirror 505 disposed directly in front of the front curtain 11 is rotated upwards. This is an effective operation in terms of moving dust dislodged by the vibration of the front curtain 11 in Step S306 away from the optical element 21. A reduced pressure is usually momentarily created in the space in front of the front curtain 11 by such rotational operation of the main mirror 505. Dust dislodged from the front curtain 11 can be moved away from the optical element 21 by introducing the dislodged dust into this negatively pressurized space at the appropriate time. As a result, dust shaken off the front curtain 11 can be efficiently-moved away from the optical element 21 using the present mechanism without adding new members.

Next the process advances to Step 308, wherein the main mirror 505 is rotated in the counterclockwise direction to return it to the optical path guiding light to the viewfinder 502. This is done upon elapse of a predetermined time period to ensure that the dust dislodged from the front curtain 11 does not return by preventing it from flying back in the direction of the front curtain 11 after initially moving away from the front curtain 11. Next, the process advances to Step S309, wherein it is determined whether the above-described shutter overloading operation has been repeated a predetermined number of times.

Thus, in the same manner as the above-described second embodiment, the third embodiment is adapted to perform the overloading operation several times in succession in order to remove dust adhered to the focal plane shutter 10. After repeating the overloading operation a predetermined number of times, the process advances to Step S310. In Step S310, the program waits until the dust completely falls to the bottom by the vibration of the front curtain 11 in Step S309 and is completely withdrawn to a location removed from the optical element 21 with the help of the main mirror 505 and the cleaning mode is terminated. Next, in Step S311, a message to the effect that the cleaning mode has been terminated (or that the cleaning operation has been completed) is displayed on the display unit 517. Subsequently, the process advances to Step S312, wherein the shooting conditions etc. stored in the RAM 1203 in Step S301 are read out and reset again in the camera 500, thereby completing the sequence.

As explained above, the third embodiment makes it possible to provide an optical device, in which dust adhered to the front curtain 11 of the focal plane shutter can be removed without applying additional force.

Moreover, since there is no need for complex shutter operations, the release time lag is not increased more than necessary and operability during shooting is not adversely affected.

Furthermore, along with permitting removal of a major portion of the dust adhered to the front curtain 11 of the focal plane shutter by operating the shutter driving unit 37, the third embodiment makes it possible to move the dislodged dust to a location removed from the optical element 21. For this reason, re-adhesion of dust can be suppressed and the effects of cleaning can be maintained for an extended period of time.

It should be noted that the third embodiment is adapted to rotate the main mirror 505 in cooperation with the vibration of the front curtain 11. However, since it would be burdensome to perform mirror rotation every time, it may be adapted to rotate the main mirror 505 after the vibrational action of the front curtain 11 has been repeated a predetermined number of times. In addition, in the same manner as in the first embodiment, it is possible to carry out dust-dislodging processing based on the vibration of the front curtain 11 only once and accordingly rotate the main mirror only once.

Moreover, in the same manner as in the first embodiment, the third embodiment is adapted to implement new components for vibrating the front curtain and means for moving dust in directions other than the direction of the optical element 21 without adding new parts. However, components adapted for partial transmission of shutter loading action directly to the front curtain 11 may be added and new parts guiding dust in other directions may be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2006-115010, filed Apr. 18, 2006, which is hereby incorporated by reference herein in their entirety.

What is claimed is:

1. An optical device comprising:
    a photoelectric transducer configured to convert an optical image of a photographic object into an electrical signal;
    a focal plane shutter unit having a light shield member, configured to switch between a light shielding state in which the light shield member shields an incident light from passing to the photoelectric transducer and a light passing state in which the light shield member allows the incident light to pass to the photoelectric transducer; and
    a driving unit configured to drive the focal plane shutter unit; and
    wherein the driving unit moves the light shield member to vibrate the focal plane shutter unit while the focal plane shutter unit maintains the light shielding state, thereby dust adhering to the focal plane shutter unit is removed.

2. An optical device including an apparatus for removing foreign substances from a shutter unit comprising:
    a photoelectric transducer configured to convert an optical image of a photographic object into an electrical signal;
    a focal plane shutter unit having a light shield member configured to switch between a light shielding state in which the light shield member shields an incident light from passing to the photoelectric transducer and a light passing state in which the light shield member allows the incident light to pass to the photoelectric transducer; and
    a driving unit configured to drive the focal plane shutter unit;
    wherein the driving unit moves the light shield member to vibrate the focal plane shutter unit while the focal plane shutter unit maintains the light shielding state, thereby dust adhering to the focal plane shutter unit is removed.

3. An optical device according to claim 1, further comprising:
    a mirror provided in front of the focal plane shutter unit, along the optical axis of light incident on the photoelectric transducer; and
    a mirror driving unit configured to drive the mirror,
    wherein the mirror driving unit drives the mirror after the driving unit has moved the light shield member to vibrate the focal plane shutter unit.

4. An optical device according to claim 1, wherein the driving unit charges a spring of the focal plane shutter unit to vibrate the focal plane shutter unit.

5. An optical device according to claim 1, further comprising an operation mode setting unit configured to set an operation mode of the optical device, wherein the mode setting unit sets a cleaning mode for removing an alien substance attached in the optical device, and
    wherein in the cleaning mode, the driving unit moves the light shield member while the focal plane shutter unit maintains the light shielding state.

6. A method for removing foreign substances from an optical device comprising a photoelectric transducer that converts an optical image of a photographic object into an electrical signal, a focal plane shutter unit having a light shield member, that switches between a light shielding state in which the light shield member shields an incident light from passing to the photoelectric transducer and a light passing state in which the light shield member allows the incident light to pass to the photoelectric transducer, and a driving unit that drives the focal plane shutter, the method comprising:
    a vibration step of driving the focal plane shutter unit, wherein the light shield member is moved to vibrate the focal plane shutter unit while the focal plane shutter unit maintains the light shielding state, thereby dust adhering to the focal plane shutter unit is removed.

7. A method according to claim 6, further comprising a prohibiting step of prohibiting that the focal plane shutter unit switches from the light shielding state to the light passing state in a predetermined time period after the light shield member is moved to vibrate the focal plane shutter unit.

8. A method according to claim 6, further comprising:
    a mirror driving step of driving a mirror provided in front of the focal plane shutter unit, along the optical axis of light incident on the photoelectric transducer,
    wherein the mirror driving step drives the minor after the driving unit has moved the light shield member to vibrate the focal plane shutter unit.

9. A method according to claim 6, wherein the driving step charges a spring of the focal plane shutter unit to vibrate the focal plane shutter unit.

10. A method according to claim 6, further comprising an operation mode setting step of setting an operation mode of the optical device, wherein the mode setting step sets a cleaning mode for removing an alien substance attached in the optical device, and
    wherein in the cleaning mode, the light shield member is moved while the focal plane shutter unit maintains the light shielding state.

* * * * *